US010466415B2

(12) United States Patent
Nakashiba et al.

(10) Patent No.: US 10,466,415 B2
(45) Date of Patent: Nov. 5, 2019

(54) SEMICONDUCTOR DEVICE AND METHOD OF MANUFACTURING THE SAME

(71) Applicant: Renesas Electronics Corporation, Koutou-ku, Tokyo (JP)

(72) Inventors: Yasutaka Nakashiba, Ibaraki (JP); Shinichi Watanuki, Ibaraki (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/961,435

(22) Filed: Apr. 24, 2018

(65) Prior Publication Data

US 2018/0246276 A1    Aug. 30, 2018

Related U.S. Application Data

(62) Division of application No. 15/186,610, filed on Jun. 20, 2016, now Pat. No. 9,977,186.

(30) Foreign Application Priority Data

Jul. 30, 2015    (JP) .................................. 2015-150937

(51) Int. Cl.
*G02B 6/12*    (2006.01)
*G02B 6/122*    (2006.01)
(Continued)

(52) U.S. Cl.
CPC .............. *G02B 6/122* (2013.01); *G02B 6/136* (2013.01); *G02F 1/025* (2013.01); *G02B 6/34* (2013.01);
(Continued)

(58) Field of Classification Search
None
See application file for complete search history.

(56) References Cited

U.S. PATENT DOCUMENTS 7,136,544 B1 *  11/2006  Gunn, III ........... G02B 6/12004
                                                      385/3
2003/0059190 A1   3/2003  Gunn, III et al.
(Continued)

FOREIGN PATENT DOCUMENTS

JP        2010-536170 A      11/2010
JP        2012-027198 A       2/2012
(Continued)

OTHER PUBLICATIONS

Office Action dated Feb. 5, 2019, in Japanese Patent Application No. 2015-150937.
(Continued)

*Primary Examiner* — Michelle R Connelly
(74) *Attorney, Agent, or Firm* — Shapiro, Gabor and Rosenberger, PLLC

(57) ABSTRACT

A semiconductor device including an optical waveguide and a p-type semiconductor portion is configured as follows. The optical waveguide includes: a first semiconductor layer formed on an insulating layer; an insulating layer formed on the first semiconductor layer; and a second semiconductor layer formed on the insulating layer. The p-type semiconductor portion includes the first semiconductor layer. The film thickness of the p-type semiconductor portion is smaller than that of the optical waveguide. By forming the insulating layer between the first semiconductor layer and the second semiconductor layer, control of the film thicknesses of the optical waveguide and the p-type semiconductor portion is facilitated. Specifically, when the unnecessary second semiconductor layer is removed by etching in a step of forming the p-type semiconductor portion, the insulating layer which is the lower layer functions as an etching stopper, and the film thickness of the p-type semiconductor portion can be easily adjusted.

8 Claims, 24 Drawing Sheets

(51) Int. Cl.
  *G02B 6/124*   (2006.01)
  *G02B 6/136*   (2006.01)
  *G02F 1/025*   (2006.01)
  *G02B 6/34*    (2006.01)

(52) U.S. Cl.
  CPC ............. *G02B 2006/12038* (2013.01); *G02B 2006/12061* (2013.01); *G02B 2006/12097* (2013.01); *G02B 2006/12107* (2013.01)

(56) References Cited

U.S. PATENT DOCUMENTS

| | | | |
|---|---|---|---|
| 2005/0123259 A1* | 6/2005 | Gunn, III | ............... B82Y 20/00 385/129 |
| 2006/0008223 A1 | 1/2006 | Gunn, III et al. | |
| 2011/0084308 A1 | 4/2011 | Loh et al. | |
| 2017/0082877 A1* | 3/2017 | Arimoto | ................. G02F 1/025 |

FOREIGN PATENT DOCUMENTS

| | | |
|---|---|---|
| JP | 2015-129828 A | 7/2015 |
| WO | WO 2015/105063 A1 | 7/2015 |

OTHER PUBLICATIONS

Office Action dated Jul. 30, 2019, in Japanese Patent Application No. 2015-150937.

\* cited by examiner

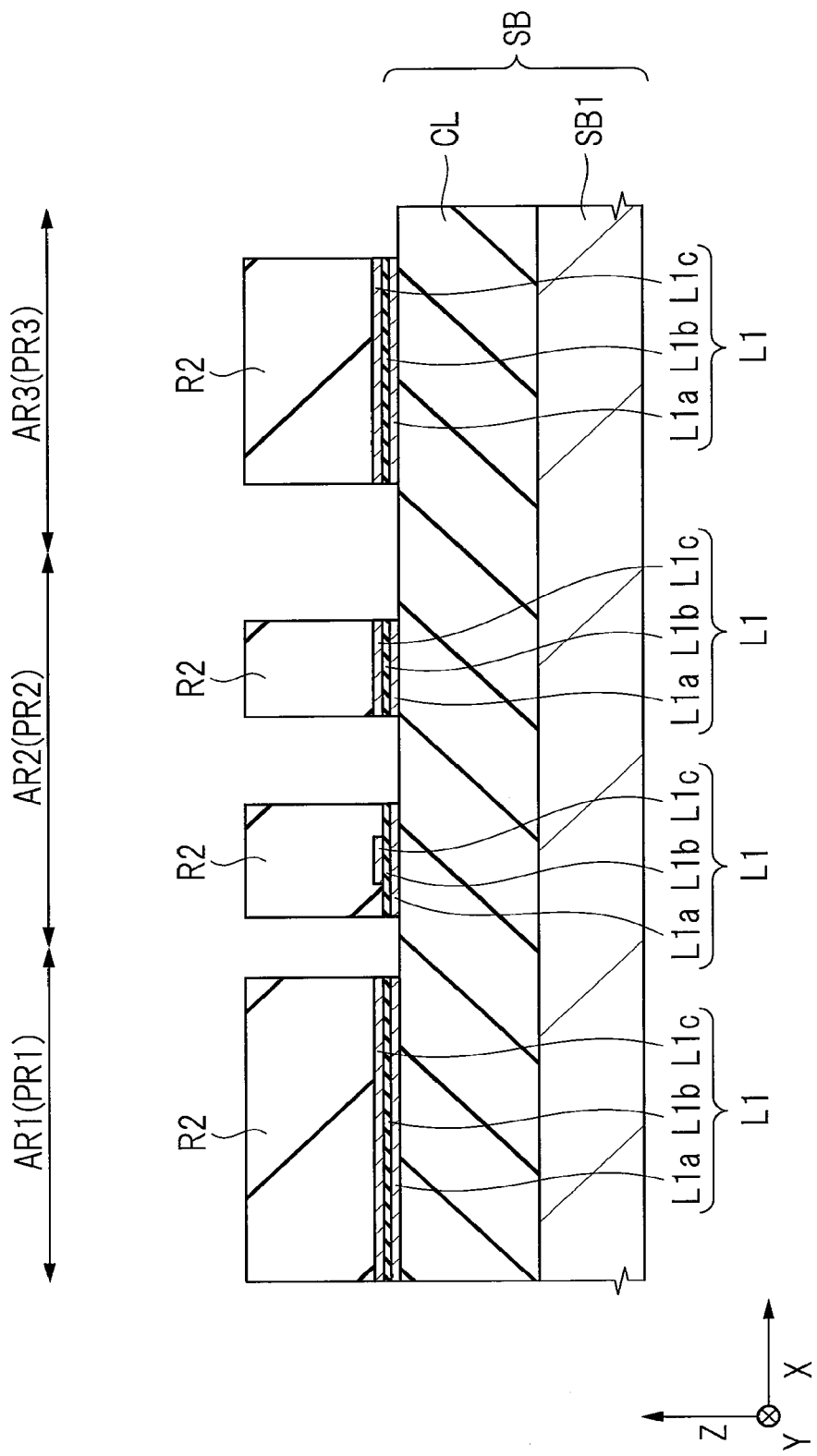

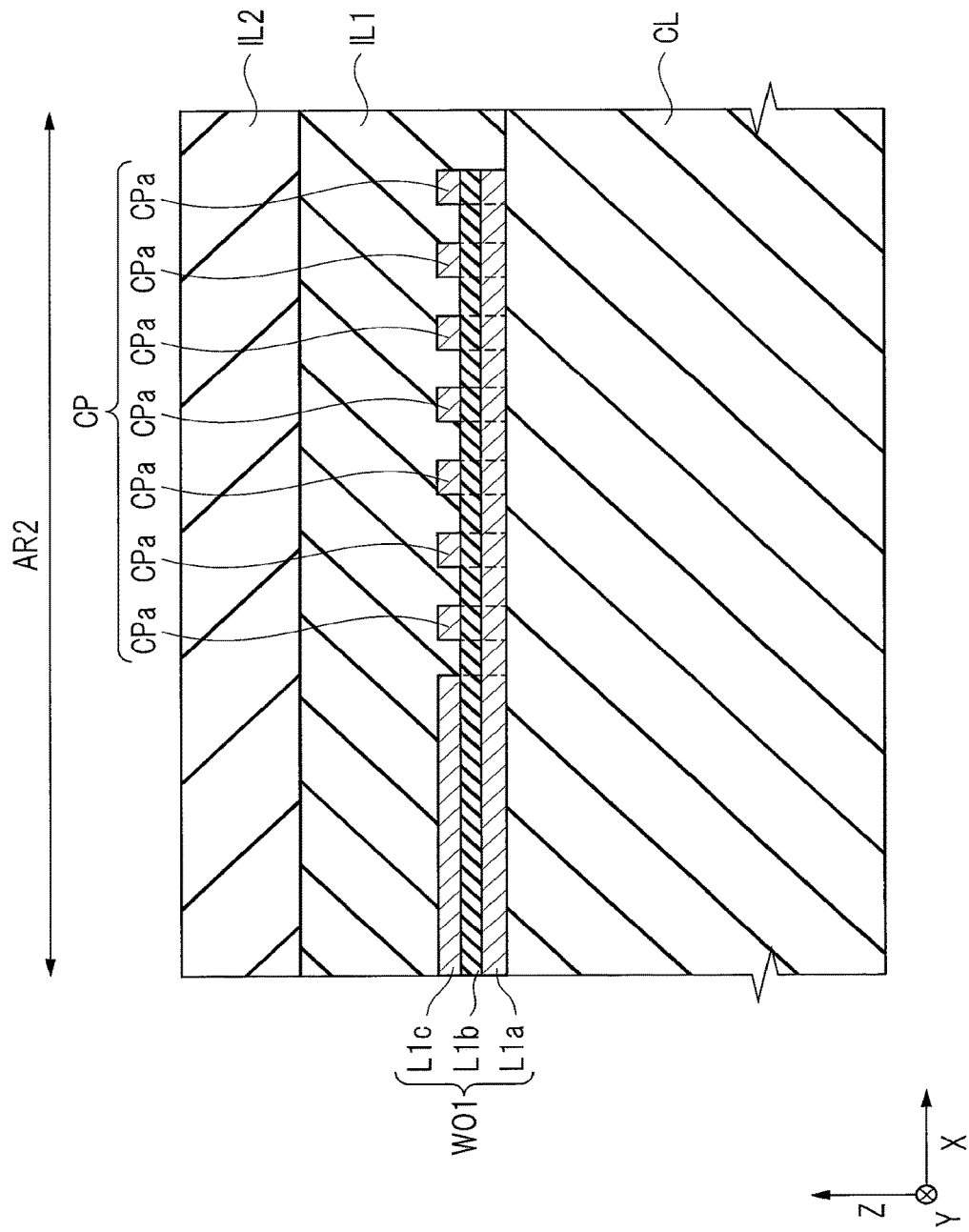

SEMICONDUCTOR DEVICE AND METHOD OF MANUFACTURING THE SAME

CROSS-REFERENCE TO RELATED APPLICATION

The present application claims priority from Japanese Patent Application No. 2015-150937 filed on Jul. 30, 2015, the content of which is hereby incorporated by reference into this application.

TECHNICAL FIELD OF THE INVENTION

The present invention relates to a semiconductor device and a method of manufacturing the same, and can be applied preferably to, for example, a semiconductor device having an optical waveguide and to a method of manufacturing the semiconductor device.

BACKGROUND OF THE INVENTION

In recent years, the silicon photonics technology has been developed. A silicon photonics technique has been developed. The silicon photonics technique is a connection technique between an optical device and an electronic device by using an optical circuit which is made of silicon as a material and which uses an optical waveguide. A semiconductor device on which the optical device and the electronic device connected by using the optical circuit as described above is mounted is referred to as an optical communication module.

Such semiconductor devices include a semiconductor device including an optical waveguide which serves as an optical signal transmission line and which is made of a semiconductor layer formed on a basic body via an insulating layer, and having an insulating film formed to cover the optical waveguide. In this case, the optical waveguide functions as a core layer, and the insulating layer and insulating film function as clad layers.

Japanese Patent Application Laid-Open Publication No. 2012-27198 (Patent Document 1) discloses an optical semiconductor device having a semiconductor layer of an intrinsic semiconductor formed on a substrate and having an optical waveguide making up a part of the semiconductor layer.

SUMMARY OF THE INVENTION

In an optical waveguide made of silicon as a material, light traveling through the optical waveguide propagates while partially circumferentially bleeding in a range as wide as about a wavelength. In order to reduce a propagation loss due to this light bleeding, a circumference (top and bottom, and right and left) of the optical waveguide is covered with an insulating film made of silicon oxide.

Therefore, a configuration in which a lower side of the optical waveguide is covered with a thick insulating layer by using a so-called SOI substrate. In this case, respective portions of a semiconductor element including the optical waveguide is formed on a thin semiconductor layer on the thick insulating film.

However, when respective portions of the semiconductor element including the optical waveguide are different from each other in the film thickness, it is required to etch the thin semiconductor layer to the middle of its depth. However, control of the etching is difficult, and thus, variation in the film thickness easily occurs.

The other object and novel characteristics will be apparent from the description of the present specification and the accompanying drawings.

The typical summary of the inventions disclosed in the present application will be briefly described as follows.

A semiconductor device described in one embodiment disclosed in the present invention includes an optical waveguide and a first semiconductor portion connected to the optical waveguide. The optical waveguide has a first portion made of a semiconductor formed on an insulating film, a second portion made of an insulator formed on the first portion, and a third portion made of a semiconductor formed on the second portion. The first semiconductor portion has a fourth portion in the same layer as that of the first portion. The first semiconductor portion has a film thickness smaller than a film thickness of the optical waveguide.

A method of manufacturing a semiconductor device described in one embodiment disclosed in the present invention includes a step of forming an optical waveguide and a first semiconductor portion connected to the optical waveguide by patterning an element forming layer. The element forming layer includes a first layer made of a semiconductor formed on an insulating layer, a second layer made of an insulator formed on the first portion, and a third layer made of a semiconductor formed on the second portion. The step of forming the optical waveguide and the first semiconductor portion has a step of etching the third layer.

According to a semiconductor device described in a typical embodiment disclosed in the present invention, a semiconductor device with fine characteristics can be easily manufactured.

According to a method of manufacturing a semiconductor device described in a typical embodiment disclosed in the present invention, a semiconductor device with fine characteristics can be easily manufactured.

BRIEF DESCRIPTIONS OF THE DRAWINGS

FIG. 6 is a cross-sectional view showing a step of manufacturing the semiconductor device of the first embodiment, continued from FIG. 5;

FIG. 24 is a cross-sectional view showing a configuration of a semiconductor device of a sixth application example of the second embodiment;

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range (including number of pieces, values, amount, range, and the like) described above.

Hereinafter, the embodiments will be described in detail based on the drawings. Note that components having the same function are denoted by the same or similar reference symbols throughout all the drawings for describing the embodiments, and the repetitive description thereof is omitted. Also, if there are a plurality of similar members (portions), an individual or specific portion may be shown by adding a reference symbol to a generic symbol. Also, in the following embodiments, the description of the same or similar portion are not repeated in principle unless otherwise required.

Also, in some drawings used in the embodiments, hatching is omitted even in a cross-sectional view so as to make the drawings easy to see.

Also, in the cross-sectional view and the plan view, a size of each portion does not correspond to that of the practical device, and the specific portion may be illustrated to be relatively large in order to easily understand the drawings in some cases. Also, even in the cross-sectional view and the plan view corresponding thereto, the specific portion may be illustrated to be relatively large in order to easily understand the drawings in some cases.

First Embodiment

Hereinafter, a semiconductor device of the present embodiment will be described in detail with reference to the drawings.

[Description of Structure]

Figure 1:
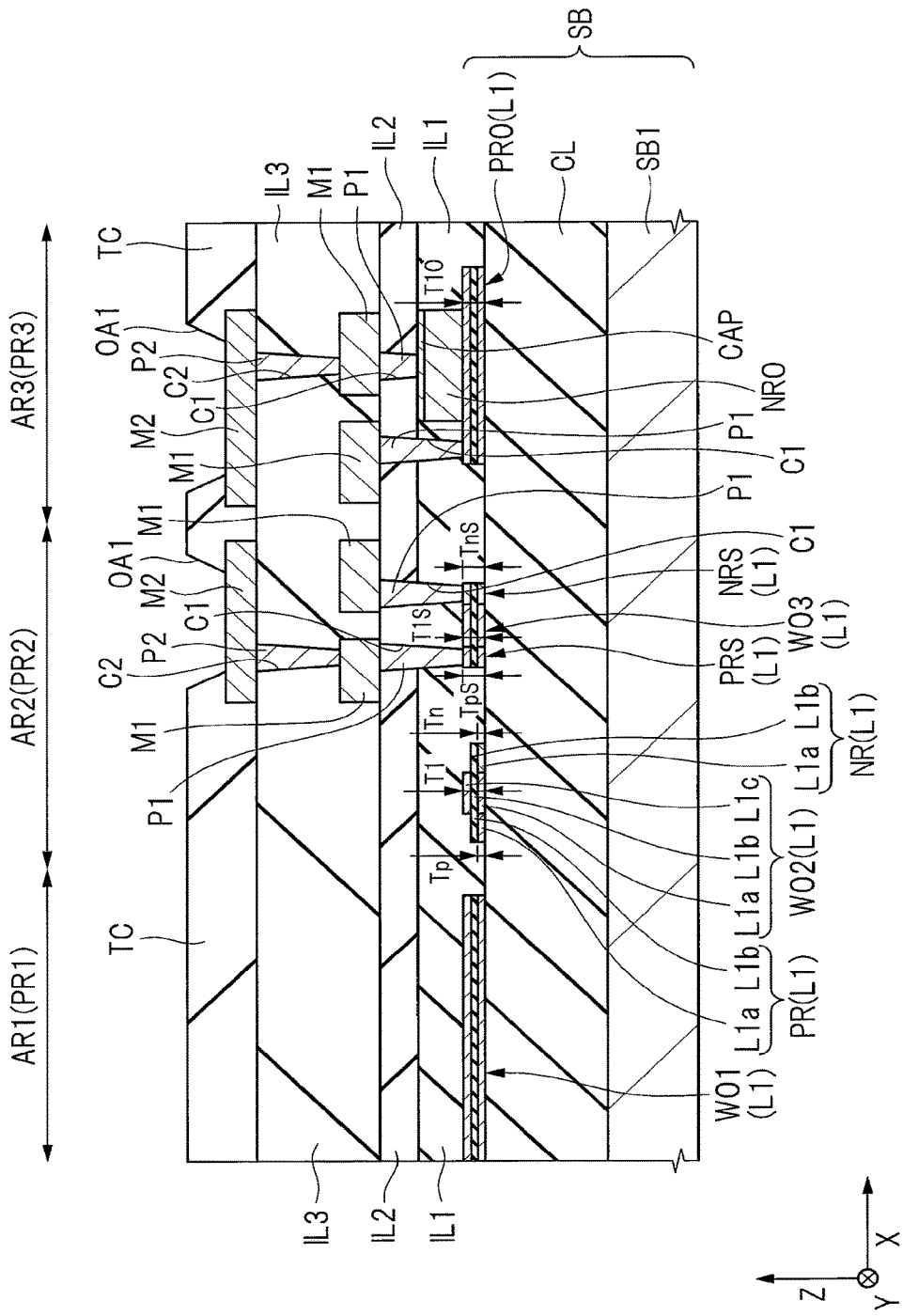
FIG. 1 is a cross-sectional view showing a configuration of a semiconductor device of a first embodiment.
Figure 2:
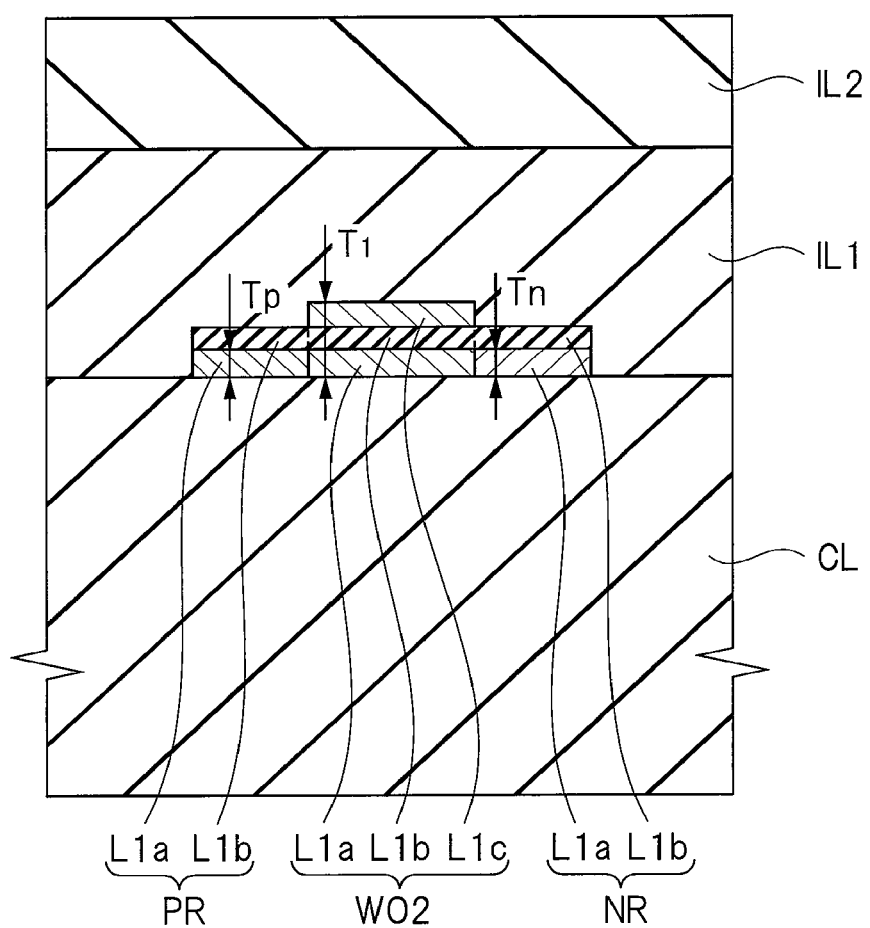
FIG. 2 is a cross-sectional view showing a configuration of a rib-type element of the semiconductor device of the first embodiment.
Figure 3:
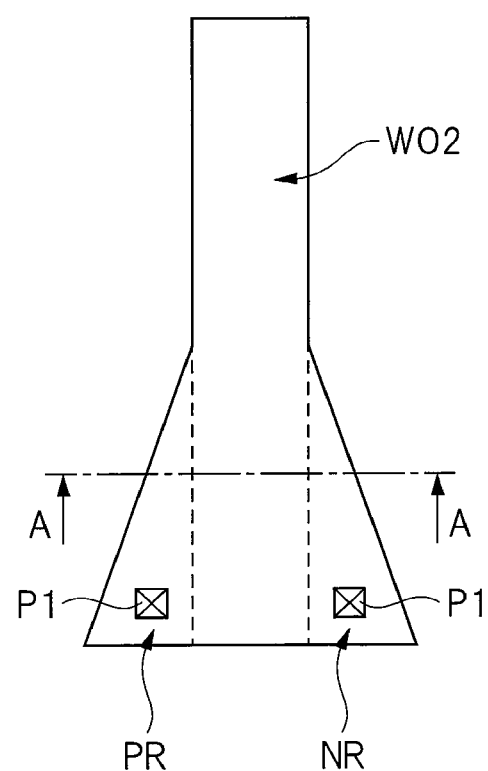
FIG. 3 is a plan view showing a configuration of a rib-type element of the semiconductor device of the first embodiment.

FIG. 1 is a cross-sectional view showing a configuration of the semiconductor device of the first embodiment. The semiconductor device shown in FIG. 1 is the semiconductor device (optical semiconductor device) including an optical waveguide formed of a semiconductor layer. FIG. 2 is a cross-sectional view showing a configuration of a rib-type element of the semiconductor device of the present embodiment. FIG. 3 is a plan view showing a configuration of the rib-type element of the semiconductor device of the present embodiment. For example, the cross-sectional view of FIG. 2 corresponds to an A-A cross section of FIG. 3.

As shown in FIG. 1, the semiconductor device of the present embodiment includes an optical signal transmission line portion PR1, an optical modulation portion PR2, and a photoelectric conversion portion PR3, that are formed in regions AR1, AR2, and AR3 of an SOI (Silicon on Insulator) substrate SB, respectively. The SOI substrate SB is formed of a basic body SB1, an insulating layer CL formed on the basic body SB1, and an element forming layer L1 formed on the insulating layer CL.

As the basic body (referred also to as support substrate) SB1, for example, a silicon (Si) single-crystal substrate can be used. For example, a p-type Si single-crystal substrate with a plane orientation of (100) and a resistivity of 5 to 50 Ωcm can be used as the basic body SB1.

The insulating layer CL is referred also to as BOX (Buried Oxide) layer. As the insulating layer CL, for example, a silicon oxide ($SiO_2$) film can be used. A film thickness of the insulating layer CL is, for example, about 2 to 3 μm.

The element forming layer L1 has a semiconductor layer made of silicon, and is referred also to as SOI (Silicon on Insulator) layer. Here, in the present embodiment, the element forming layer L1 has a first semiconductor layer L1a and a second semiconductor layer L1c, and an insulating layer L1b formed between the first semiconductor layer L1a and the second semiconductor layer L1c. In other words, the element forming layer L1 has the first semiconductor layer L1a formed on the insulating layer CL, the insulating layer L1b formed on the first semiconductor layer L1a, and the second semiconductor layer L1c formed on the insulating layer L1b.

Figure 4:
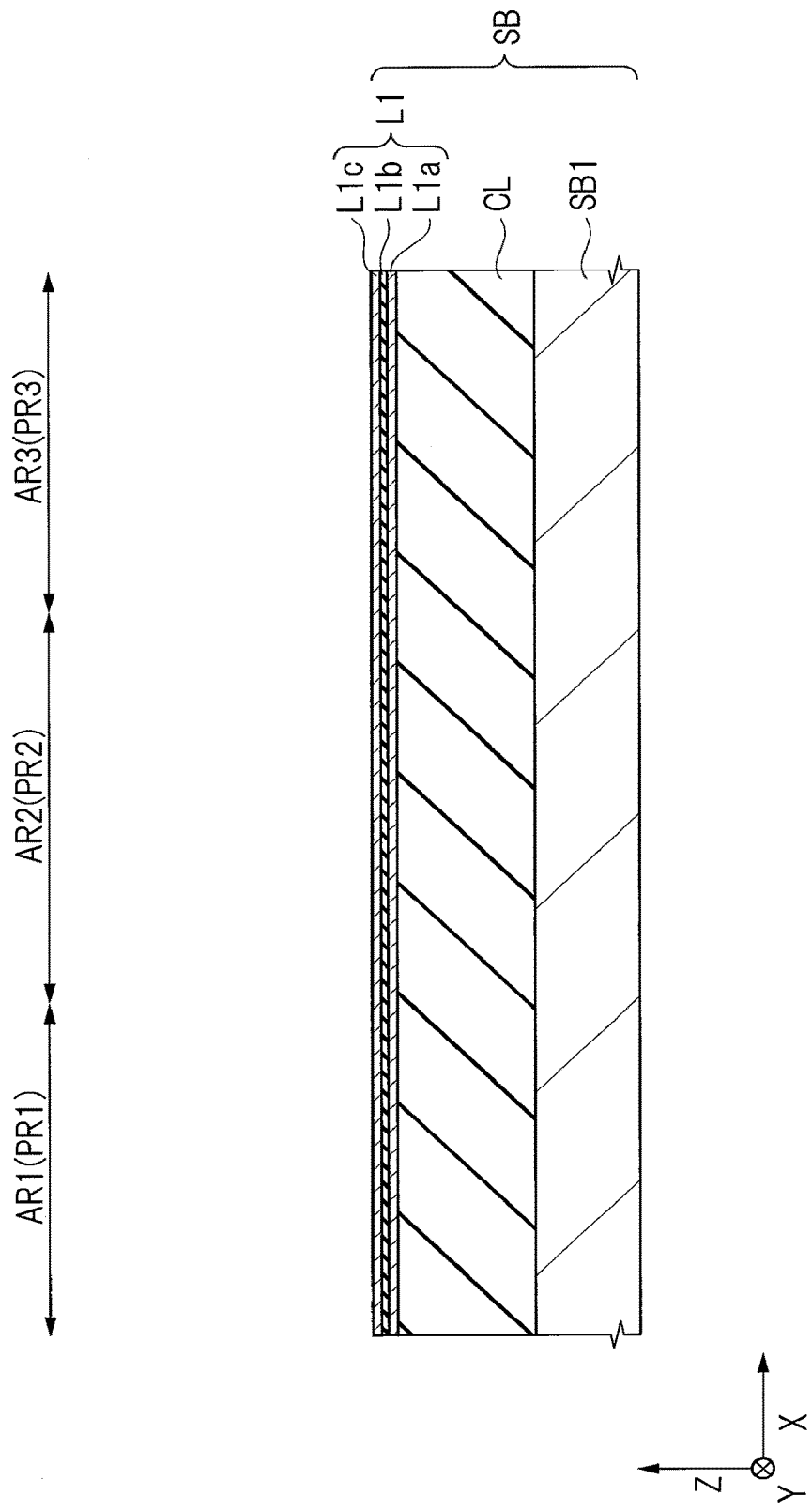
FIG. 4 is a cross-sectional view showing a step of manufacturing a semiconductor device of a first embodiment.

As the element forming layer L1 (which is a stacked body formed of the first semiconductor layer L1a, the insulating layer L1b, and the second semiconductor layer L1c), for example, a stacked body formed of a first silicon layer having a film thickness of about 150 nm, a silicon oxide layer having a film thickness of about 10 nm formed on the first silicon layer, and a second silicon layer having a film thickness of about 150 nm can be used (see FIG. 4). As the insulating layer L1b, not only the silicon oxide layer but also an oxynitride silicon layer, silicon nitride layer, etc., can be used. In the case of using the oxynitride silicon layer or silicon nitride layer, its film thickness is also about 10 nm.

Hereinafter, a configuration of each of the optical signal transmission line portion PR1, the optical modulation portion PR2, and the photoelectric conversion portion PR3 will be described.

<Optical Signal Transmission Line Portion>

The optical signal transmission line portion PR1 is formed in the region AR1 (FIG. 1). In this region AR1, an optical waveguide WO1 is formed. The optical waveguide WO1 is formed in the element forming layer L1 (which is the stacked body formed of the first semiconductor layer L1a, the insulating layer L1b, and the second semiconductor layer L1c).

Specifically, the optical waveguide WO1 is formed of the first semiconductor layer L1a formed on the insulating layer LC, the insulating layer L1b formed on the first semiconductor layer L1a, and the second semiconductor layer L1c formed on the insulating layer L1b. Here, the insulating layer L1b has a smaller film thickness (e.g., 10 nm) than that of the wavelength of light (e.g., 1.5 μm), and therefore, does not affect optical signal transmission. The optical waveguide WO1 is formed in, for example, a linear shape in the X direction (rectangular shape having long sides extending in the X direction). That is, in an optical waveguide made of silicon, when the light propagates through the optical waveguide while partially circumferentially bleeding in a range as wide as about the wavelength of the light, this light bleeding causes a propagation loss of an optical signal. In order to reduce such a propagation loss of the optical signal, it is required to cover the circumference (top and bottom, and right and left) of the optical waveguide with an insulating film made of silicon oxide. For example, on top and bottom portions of the optical waveguide, a thick silicon oxide film having a film thickness of 2 to 5 μm is arranged. In order to prevent the optical interference, it is required to, for example, secure a gap of about 5 μm between the optical waveguides. Also, between the optical waveguides, silicon oxide is arranged. A refraction index "n" of the silicon oxide is about 1.45.

However, the present embodiment utilizes the light bleeding (permeation, evanescence) to transmit an optical signal. That is, even if the insulating layer L1b intermediates in the middle of the optical waveguide WO1, the optical signal can be transmitted as long as the film thickness of the insulating layer L1b is extremely small.

On the optical waveguide WO1, interlayer insulating films Il1, IL2, and IL3 and a protective film TC are formed. Note that each of the interlayer insulating films Il1, IL2, and IL3 is formed of, for example, a silicon oxide film. The protective film TC is formed of, for example, an oxynitride silicon film.

<Optical Modulation Portion>

The optical modulation portion PR2 is formed in the region AR2 (FIG. 1). In this region AR2, an element that changes the phase of light is formed. Here, an element having a pin structure will be described as an example. However, the element is not limited to this.

In the region AR2, an optical waveguide WO2, a p-type semiconductor portion PR, and an n-type semiconductor portion NR are formed (FIGS. 1 and 2). By them, the element having the pin structure (a diode having the pin structure) is formed.

The optical waveguide WO2 is formed of the first semiconductor layer L1a formed on the insulating layer LC, the insulating layer L1b formed on the first semiconductor layer L1a, and the second semiconductor layer L1c formed on the insulating layer L1b. Also here, the insulating layer L1b is extremely thin (e.g., 10 nm), and therefore, does not affect optical signal transmission. The optical waveguide WO2 is formed in, for example, a linear shape in the Y direction (rectangular shape having long sides extending in the Y direction) (FIG. 3).

That is, in an optical waveguide made of silicon, when the light propagates through the optical waveguide while partially circumferentially bleeding in a range as wide as about the wavelength of the light, this light bleeding causes a propagation loss of an optical signal. Therefore, in order to reduce such a propagation loss of the optical signal, it is required to cover the circumference (top and bottom, and right and left) of the optical waveguide with an insulating film made of silicon oxide. Such light bleeding is utilized, and, even if the insulating layer L1b intermediates in the middle of the optical waveguide WO2, the optical signal can be transmitted as long as the film thickness of the insulating layer L1b is extremely small.

As described above, the semiconductor portions (PR, NR) are provided on both sides of the optical waveguide WO2. Here, the p-type semiconductor portion PR is provided on one side (left side in FIGS. 1 and 2) of the optical waveguide WO2. Also, the n-type semiconductor portion NR is provided on the other side (right side in FIGS. 1 and 2) of the optical waveguide WO2. For example, the semiconductor portions (PR, NR) are provided on ends of the optical waveguide WO2 linearly extending in the Y direction (FIG. 3). Note that no impurity ion is implanted into the optical waveguide WO2. In other words, the optical waveguide WO2 is made of an intrinsic semiconductor, that is, an i-(intrinsic)-type region.

As described above, the phase of light can be changed by providing a structure portion (a diode having the pin structure) formed of the optical waveguide WO2 and the p-type semiconductor portion PR and n-type semiconductor portion NR formed on both sides of the optical waveguide WO2. Note that a plug P1 is formed on each of the p-type semiconductor portion PR and the n-type semiconductor portion NR (see FIG. 3). A potential is applied to this plug P1 via a wiring, etc. (e.g., via M1, P2, or M2).

For example, when a forward bias is applied to the above-described structure portion, carriers are injected into the optical waveguide WO2. The injection of the carriers into the optical waveguide WO2 causes a carrier plasma effect, that is, a phenomenon due to increase in electron hole pairs (plasma) by the optically-generated carriers, in the optical waveguide WO2, so that the refraction index of light in the optical waveguide WO2 changes. The change in the refraction index of light in the optical waveguide WO2 can change the wavelength of light traveling through the optical waveguide WO2, and therefore, the phase of light can be changed in the course of the traveling through the optical waveguide WO2. As described above, note that the plug (P1) is formed on the second semiconductor layer L1c containing the p-type impurity, which is the uppermost layer of the p-type semiconductor portion PR.

Here, the structure body is processed into a rib shape (convex shape). The optical waveguide WO2 is formed of a stacked body (L1) obtained by stacking the first semiconductor layer L1a, the insulating layer L1b, and the second semiconductor layer L1c in this order from bottom. On the other hand, the p-type semiconductor portion PR is formed of the first semiconductor layer L1a containing a p-type impurity. Also, the n-type semiconductor portion NR is formed of the first semiconductor layer L1a containing an n-type impurity. That is, the film thickness (height) T1 of the optical waveguide WO2 is larger than the film thickness (height) Tp of the p-type semiconductor portion PR. Also, the film thickness (height) T1 of the optical waveguide WO2 is also larger than the film thickness (height) Tn of the n-type semiconductor portion NR. A relation "T1>Tp≈Tn" is established. Note that the insulating film L1b remains on the first semiconductor layer L1a containing the p-type impurity. Also, on the first semiconductor layer L1a containing the n-type impurity, the insulating film L1b remains. That is, the insulating film L1b is arranged on a level difference surface (level difference portion).

Here, in the present embodiment, the insulating layer L1b is formed between the first semiconductor layer L1a and the second semiconductor layer L1c as described above, and therefore, it is easy to control the film thickness (height) T1 of the optical waveguide WO2, the film thickness (height) Tp of the p-type semiconductor portion PR, and the film thickness (height) Tn of the n-type semiconductor portion NR. That is, since the film thickness (height) Tp of the p-type semiconductor portion PR and the film thickness (height) Tn of the n-type semiconductor portion NR are determined by the film thickness of the first semiconductor layer L1a, a variation in the film thickness (height) Tp of the p-type semiconductor portion PR and the film thickness (height) Tn of the n-type semiconductor portion NR can be suppressed. Specifically, as described later, when the unnecessary second semiconductor layer L1c is removed by etching in a step of forming the p-type semiconductor portion PR and the n-type semiconductor portion NR, the insulating layer L1b in the lower layer can function as an etching stopper so that each film thickness of the p-type semiconductor portion PR and n-type semiconductor portion NR can be easily adjusted.

In this manner, according to the present embodiment, the insulating layer L1b intermediates between the first semiconductor layer L1a and the second semiconductor layer L1c, so that the light control characteristics (control characteristics of the light phase) due to the above-described structure body can be improved as the transmission characteristics of optical signals are maintained.

In the region AR2, an optical waveguide WO3, a p-type semiconductor portion PRS, and an n-type semiconductor portion NRS are formed. By them, an element having the pin structure (a diode having the pin structure) is formed.

As similar to the optical waveguide WO2, the optical waveguide WO3 is formed of the first semiconductor layer L1a formed on the insulating layer CL, the insulating layer L1b formed on the first semiconductor layer L1a, and the second semiconductor layer L1c formed on the insulating layer L1b. Also here, the insulating layer L1b is extremely thin (e.g., 10 nm), and therefore, does not affect optical signal transmission. Although the drawing is omitted, the optical waveguide WO3 is also formed into, for example, a linear shape in the Y direction (rectangular shape having long sides extending in the Y direction) as similar to the optical waveguide WO2.

As described above, the semiconductor portions (PRS, NRS) are provided on both sides of the optical waveguide WO3. Here, the p-type semiconductor portion PRS is provided on one side (left side in FIG. 1) of the optical waveguide WO3. Also, the n-type semiconductor portion NRS is provided on the other side (right side in FIG. 1) of the optical waveguide WO3. For example, the semiconductor portions (PRS, NRS) are provided on ends of the optical waveguide WO3 linearly extending in the Y direction. Note that no impurity ion is implanted into the optical waveguide WO3. In other words, the optical waveguide WO3 is made of an intrinsic semiconductor, that is, an i-type region.

As described above, the phase of light can be changed by providing a structure portion (a diode having the pin structure) formed of the optical waveguide WO3 and the p-type semiconductor portion PRS and n-type semiconductor portion NRS formed on both sides of the optical waveguide WO3.

For example, when a forward bias is applied to the above-described structure portion, carriers are injected into the optical waveguide WO3. The injection of the carriers into the optical waveguide WO3 causes a carrier plasma effect, that is, a phenomenon due to increase in electron hole pairs (plasma) by the optically-generated carriers, in the optical waveguide WO3, so that the refraction index of light in the optical waveguide WO3 changes. The change in the refraction index of light in the optical waveguide WO3 can change the wavelength of light traveling through the optical waveguide WO3, and therefore, the phase of light can be changed in the course of the traveling through the optical waveguide WO3.

Here, the optical waveguide WO3 of the above-described structure body is formed of a stacked body (L1) obtained by stacking the first semiconductor layer L1a, the insulating layer L1b, and the second semiconductor layer L1c in this order from bottom. Also, the p-type semiconductor portion PRS is formed of a stacked body (L1) obtained by stacking the first semiconductor layer L1a containing a p-type impurity, the insulating layer L1b, and the second semiconductor layer L1c containing a p-type impurity. Also, the n-type semiconductor portion NRS is formed of a stacked body (L1) obtained by stacking the first semiconductor layer L1a containing a n-type impurity, the insulating layer L1b, and the second semiconductor layer L1c containing a n-type impurity. In this case, the film thickness (height) T1S of the optical waveguide WO3 is the same as the film thickness (height) TpS of the p-type semiconductor portion PRS. Also, the film thickness (height) T1S of the optical waveguide WO3 is also the same as the film thickness (height) TnS of the n-type semiconductor portion NRS. A relation "T1S>TpS≈TnS" is established.

A plug P1 is formed on the second semiconductor layer L1c containing the p-type impurity, which is the uppermost layer of the p-type semiconductor portion PRS. A potential is applied to the second semiconductor layer L1c containing the p-type impurity via this plug P1. Also, a plug P1 is formed on the second semiconductor layer L1c containing the n-type impurity, which is the uppermost layer of the n-type semiconductor portion NRS. A potential is applied to the second semiconductor layer L1c containing the n-type impurity via this plug P1. In this case, the insulating layer L1b is formed in the middle of the p-type semiconductor portion PRS, and therefore, a potential is not applied to the first semiconductor layer L1a containing the p-type impurity, which is the lowermost layer of the p-type semiconductor portion PRS. Also, the insulating layer L1b is formed in the middle of the n-type semiconductor portion NRS, and therefore, a potential is not applied to the first semiconductor layer L1a containing the n-type impurity, which is the lowermost layer of the n-type semiconductor portion NRS. However, the phase of light can be changed by the second semiconductor layer L1c containing the p-type impurity, which is the uppermost layer of the p-type semiconductor portion PRS, the optical waveguide WO3, and the second semiconductor layer L1c containing the n-type impurity, which is the uppermost layer of the n-type semiconductor portion NRS, and therefore, the presence of the insulating layer L1, and therefore, the adverse effect is not caused on the change of the phase of light. In this manner, the above-described structure body may be also effectively considered to be an inverse rib-type (convex-type) structure body.

In this manner, according to the present embodiment, the insulating layer L1b intermediates between the first semiconductor layer L1a and the second semiconductor layer L1c, so that, when the element having the pin structure has components with different film thicknesses, the film thicknesses can be easily adjusted. Even when a plurality of elements each having the pin structure have components with different film thicknesses, the film thicknesses can be easily adjusted.

Here, note that the thicknesses of the first semiconductor layer L1a and the second semiconductor layer L1c are almost the same as each other. However, the thicknesses of these layers may be different from each other. In this manner, by adjusting the thicknesses of the first semiconductor layer L1a and second semiconductor layer L1c, the characteristics of a plurality of elements having the pin structure can be adjusted to desired characteristics. For example, by the size of the layer thickness, an electric resistance can be adjusted.

The plug P1 is formed of a conductive film buried in each contact hole C1 provided in the interlayer insulating films IL1 and IL2. As the conductive film, for example, a tungsten (W) film can be used. On the plug P1, a first layer wiring M1 is formed. The wiring M1 is formed of a conductive film. As the conductive film, for example, an aluminum-copper alloy (Al—Cu alloy) film can be used.

On the interlayer insulating film IL2 and wiring M1, an interlayer insulating film IL3 is formed. And, on the wiring M1, a plug P2 is formed. This plug P2 is formed of a conductive film buried in a contact hole C2 formed in the interlayer insulating film IL3. As the conductive film, for example, a tungsten (W) film can be used. On the plug P2, a second layer wiring M2 is formed. The wiring M2 is formed of a conductive film, as which, for example, an aluminum-copper alloy (Al—Cu alloy) film can be used.

On the interlayer insulating film IL3 and wiring M2, a protective film TC is formed. Note that each of the interlayer insulating films IL1, IL2, and IL3 is formed of, for example, a silicon oxide film. The protective film TC is formed of, for example, an oxynitride silicon film. The protective film TC on a partial region of the wiring M2 is removed, and an opening OA1 reaching the wiring M2 is provided. At the bottom of the opening OA1, the wiring M2 is exposed, and the exposed region of the wiring M2 serves as a pad portion (external connection portion).

<Photoelectric Conversion Portion>

As shown in FIG. 1, the photoelectric conversion portion PR3 is formed in the region AR3. The photoelectric conversion portion PR3 converts an optical signal into an electric signal. Here, an element having a p/n-junction structure will be described as an example. However, the element is not limited to this.

In the region AR3, a p-type semiconductor portion PRO and an n-type semiconductor portion NRO are formed. By them, the element having the p/n-connection structure (a diode having the pin structure) is formed.

The p-type semiconductor portion PRO is made of the stacked body (L1) formed by stacking the first semiconductor layer L1a containing a p-type impurity, the insulating layer L1b, and the second semiconductor layer L1c containing a p-type impurity. Note that the film thickness (height) T10 of the p-type semiconductor portion PRO is almost the same as the film thickness (height) of each of the optical waveguides WO1, WO2, and WO3, and the film thickness (height) of each of the p-type semiconductor portion PRS and n-type semiconductor portion NRS. For example, a relation "T1O≈T1≈T1S≈TpS≈TnS" is established. In other words, three layer films making up each of the p-type semiconductor portion PRO, the optical waveguides WO1, WO2, and WO3, the p-type semiconductor portion PRS, and the n-type semiconductor portion NRS are the same-layer film, that is, the films which are made of the same material and whose levels are the same as one another. Note that the filmmaking up each of the above-described p-type semiconductor portion PR and n-type semiconductor portion NR is the same-layer film as the lowermost layer (L1a) of the above-described three layer films. Here, the same-layer film is defined as the films which are made of the same material and whose levels are the same one another. However, they may be different from one another in the presence/absence of impurity ions and the conductive type.

The n-type semiconductor portion NRO is formed on the p-type semiconductor portion PRO. The n-type semiconductor portion NRO is made of germanium (Ge) doped with an N-type impurity. On the n-type semiconductor portion NRO, a cap layer CAP is formed. The cap layer CAP is made of silicon and is formed so as to improve the surface roughness of germanium contained in the n-type semiconductor portion NRO and so as to cover a film thickness.

A plug P1 is formed on the second semiconductor layer L1c containing the p-type impurity, which is the uppermost layer of the p-type semiconductor portion PRO. A plug P1 is formed also on the cap layer CAP on the n-type semiconductor portion NRO. By these plugs P1, a direct current flow caused by a photovoltaic effect at the p/n-junction can be extracted. That is, an optical signal can be extracted as an electric signal.

The above-described plug P1 is formed of a conductive film buried in each contact hole C1 formed in the interlayer insulating films IL1 and IL2. As the conductive film, for example, a tungsten (W) film can be used. On the plug P1, the first layer wiring M1 is formed. The wiring M1 is formed of a conductive film, as which, for example, an aluminum-copper alloy (Al—Cu alloy) film can be used.

On the interlayer insulating film IL2 and wiring M1, the interlayer insulating film IL3 is formed. And, on the wiring M1, a plug P2 is formed. This plug P2 is formed of a conductive film buried in a contact hole C2 formed in the interlayer insulating film IL3. As the conductive film, for example, a tungsten (W) film can be used. On the plug P2, a second layer wiring M2 is formed. The wiring M2 is formed of a conductive film, as which, for example, an aluminum-copper alloy (Al—Cu alloy) film can be used. Note that it is preferred to arrange, for example, an insulating film (such as silicon oxide film) having a thickness of 2 to 3 μm between the wirings M1 and M2 in order to reduce the parasitic capacitance.

On the interlayer insulating film IL3 and wiring M2, a protective film TC is formed. Note that each of the interlayer insulating films IL1, IL2, and IL3 is formed of, for example, a silicon oxide film. The protective film TC is formed of, for example, an oxynitride silicon film. A refractive index of the oxynitride silicon film (SiON film) is about 1.82. The protective film TC on a partial region of the wiring M2 is removed, and an opening OA1 reaching the wiring M2 is provided. At the bottom of the opening OA1, the wiring M2 is exposed, and the exposed region of the wiring M2 serves as a pad portion (external connection portion).

[Description of Manufacturing Method]

Then, steps of manufacturing the semiconductor device of the present embodiment will be described, and besides, the structure of the semiconductor device of the present embodiment will be clarified.

FIGS. 4 to 13 are cross-sectional views showing the steps of manufacturing the semiconductor device of the present embodiment.

First, as shown in FIG. 4, an SOI substrate SB is prepared, the SOI substrate including the basic body SB1, the insulating layer CL formed on the basic body SB1, and the element forming layer L1 formed on the insulating layer CL. For example, the prepared SOI substrate SB is prepared, the SOI substrate having the element forming layer L1 formed on the basic body SB1 made of a p-type silicon single-crystal substrate having a plane orientation of (100) and having a resistivity of 5 to 50 Ωcm via a silicon oxide (SiO$_2$) film having a thickness of, for example, about 2 to 3 μm. The element forming layer L1 is formed of the stacked body formed of the first semiconductor layer L1a, the thin insulating layer L1b on the first semiconductor layer L1a, and the second semiconductor layer L1c on the insulating layer L1b. Specifically, for example, the element forming layer L1 is formed of the stacked body formed of the first semiconductor layer L1a, which is made of silicon having a thickness of about 150 nm formed on the basic body SB1, the silicon oxide layer (L1b) having a thickness of about 10 nm formed on the first semiconductor layer L1a, and the second semiconductor layer L1c, which is made of silicon having a thickness of about 150 nm formed on the insulating layer L1b.

By using the SOI substrate SB including the element forming layer L1 having the thin insulating layer L1b formed in the middle of the semiconductor layer as described above, an element, especially a rib-type (convex-type) element, can be accurately formed. Specifically, as described alter, the rib-type (convex-type) element can be accurately formed by causing the thin insulating layer L1b to function as an etching stopper. Also, since the insulating layer L1b in the middle of the semiconductor layer is extremely thin, the transmission characteristics of optical signals can be maintained in the optical waveguide which is the convex portion of the rib-type (convex-type) element without being affected by the insulating layer L1b.

Figure 5:
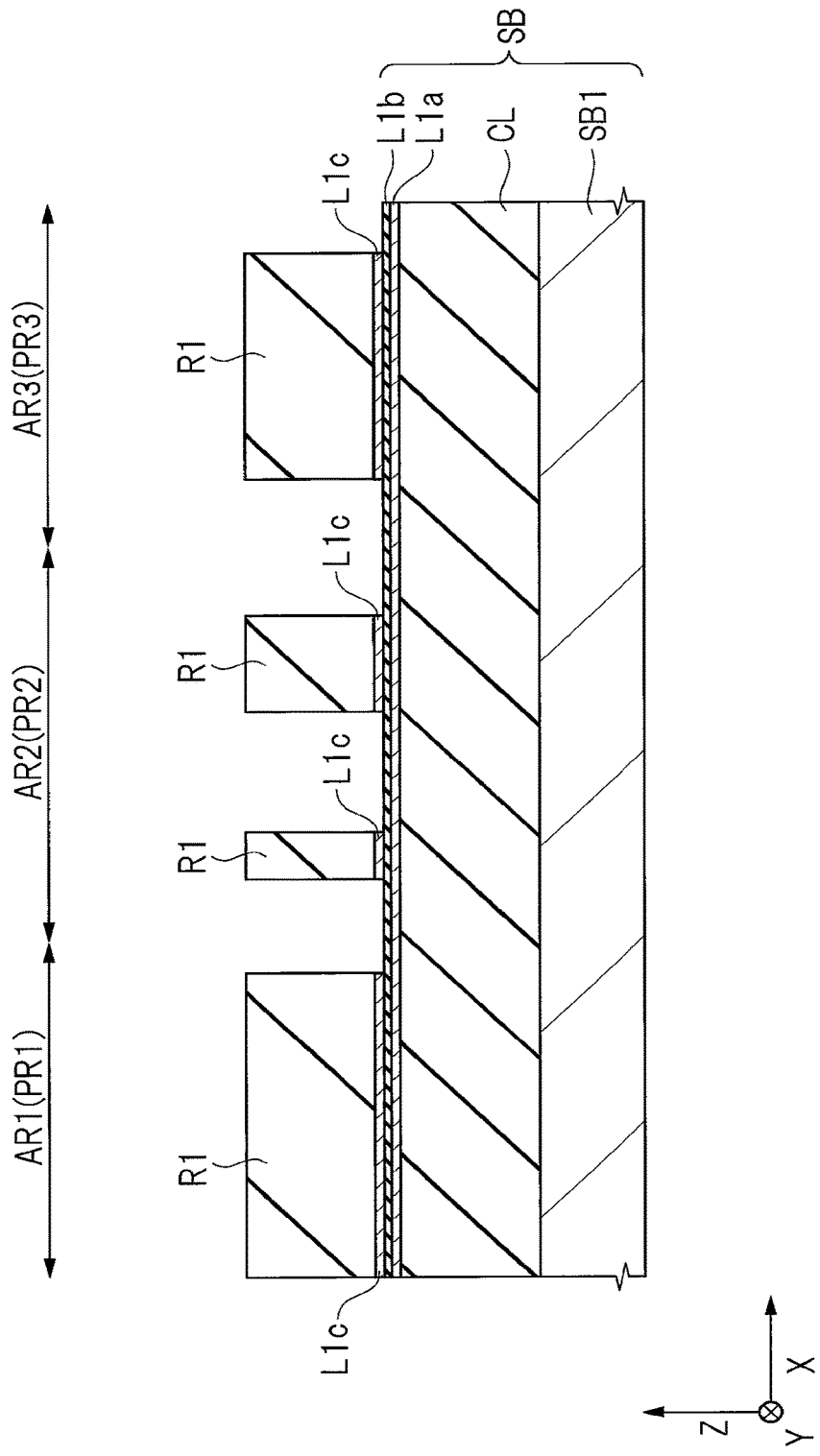
FIG. 5 is a cross-sectional view showing a step of manufacturing the semiconductor device of the first embodiment, continued from FIG. 4.

Then, as shown in FIG. 5, the second semiconductor layer L1c is formed, the second semiconductor layer L1c being the uppermost layer of the three layer films making up each of the optical waveguides WO1, WO2, and WO3, p-type semiconductor portion PRS, n-type semiconductor portion NRS, and p-type semiconductor portion PRO. First, the whole surface of the SOI substrate SB is coated with a photoresist film R1 or others, and the photoresist film R1 is left by a photolithography method (exposure and development) in a region where the p-type semiconductor portion PRO, optical waveguides WO1, WO2, and WO3, p-type semiconductor portion PRS, and n-type semiconductor portion NRS are formed. Then, the second semiconductor layer L1c is dry etched while using the photoresist film R1 as a mask. At this time, the insulating layer L1b in the lower layer plays a role of the etching stopper. It is preferred to apply an etching condition in which silicon is easy to be etched but silicon oxide is difficult to be etched. It is also preferred that the etching rate of a film which is desirably etched (second semiconductor layer L1c in this case) be higher than the etching rate of a film which is not desirably etched (insulating layer L1b in this case), that is, preferred that an etching selectivity (the etching rate of the second semiconductor layer L1c/the etching rate of the insulating layer L1b) be large. Note that wet etching may be performed in place of dry etching.

Then, the photoresist film R1 is removed by ashing, etc. Then, as shown in FIG. 6, the two layers (L1b, L1a) are formed, the two layers being the lower layers of the three layer films making up each of the optical waveguides WO1 and WO2, p-type semiconductor portion PR, n-type semiconductor portion NR, optical waveguide WO3, p-type semiconductor portion PRS, n-type semiconductor portion NRS, and p-type semiconductor portion PRO. First, the whole surface of the SOI substrate SB is coated with a photoresist film R2 or others, and the photoresist film R1 is left by a photolithography method (exposure and development) in a region where the optical waveguides WO1, WO2, and WO3, p-type semiconductor portion PRS, n-type semiconductor portion NRS, and p-type semiconductor portion PRO are formed. Then, the insulating layer L1b and the first semiconductor layer L1a are dry etched while using the photoresist film R2 as a mask. Note that the insulating layer L1b and the first semiconductor layer L1a may be individually etched by using different etchant. Also, wet etching may be performed in place of dry etching. Then, the photoresist film R2 is removed by ashing, etc.

By the above-described steps, each film (L1a, L1b, and L1c) making up the optical waveguides WO1 and WO2, p-type semiconductor portion PR, n-type semiconductor portion NR, the optical waveguide WO3, p-type semiconductor portion PRS, n-type semiconductor portion NRS, and p-type semiconductor portion PRO can be formed. At this time, according to the present embodiment, the rib-type (convex-type) element (WO2, PR, NR) can be accurately formed. FIG. 7 is a cross-sectional view showing a step of manufacturing the rib-type element of the semiconductor device of the present embodiment.

Figure 7A:
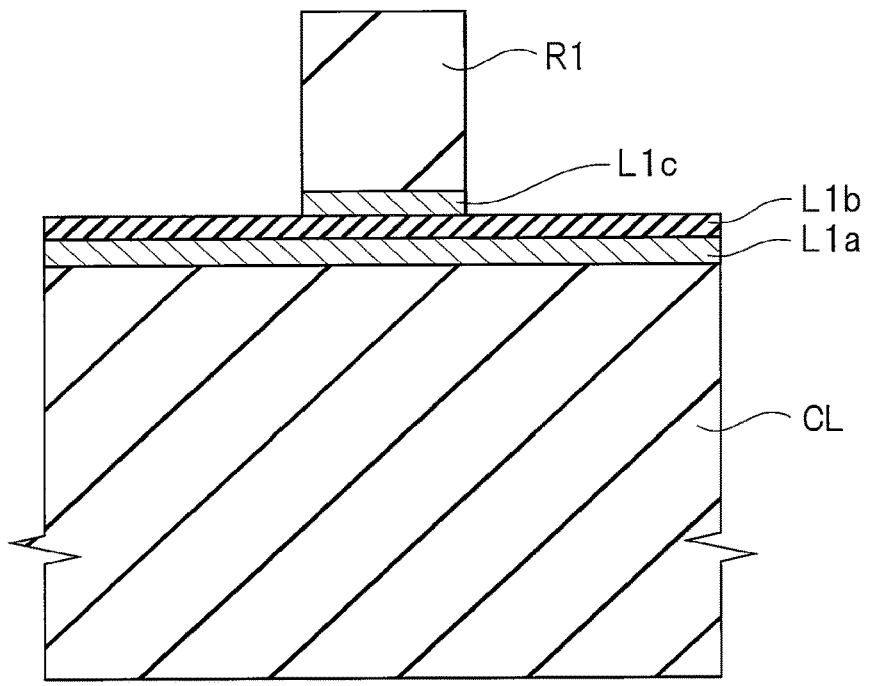
FIG. 7A is a cross-sectional view showing a step of manufacturing a semiconductor device of a first embodiment.
Figure 7B:
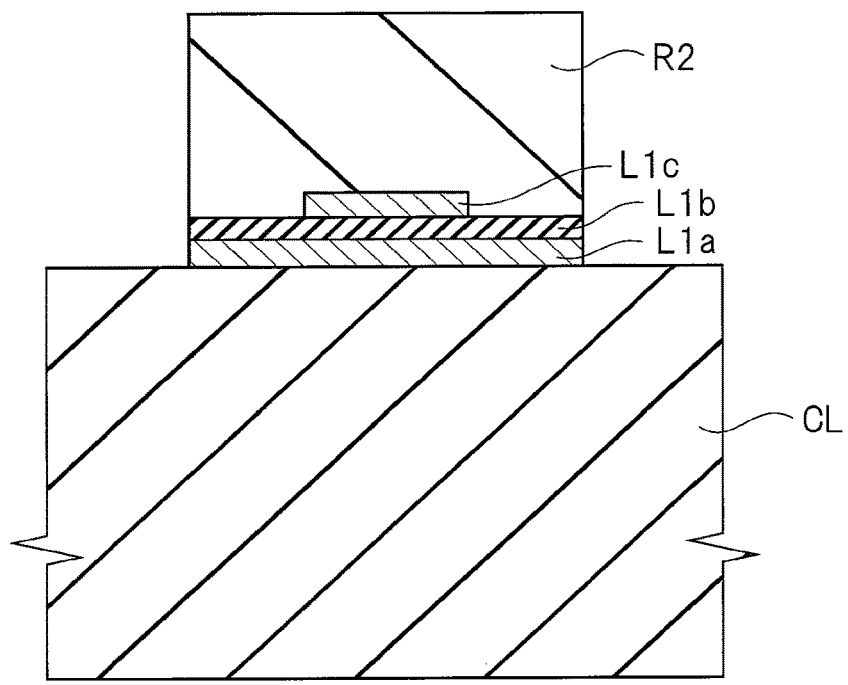
FIG. 7B is a cross-sectional view showing a step of manufacturing a semiconductor device of a first embodiment.

That is, as shown in FIG. 7A, when the second semiconductor layer L1c making up the uppermost layer of the three layer films of the optical waveguide WO2 is etched, the insulating layer L1b which is the lower layer plays a role of the etching stopper. That is, when the second semiconductor layer L1c is etched until the insulating layer L1b is exposed, the insulating layer L1b which is the lower layer plays the role of the etching stopper. Then, as shown in FIG. 7B, the exposed insulating layer L1b and the first semiconductor layer L1a which is the lower layer than the exposed insulating layer L1b are etched. By such steps, a variation in the film thickness of each portion of the rib-type (convex-type) element can be reduced, and therefore, each portion can be accurately formed.

Here, the thickness of the insulating layer L1b will be described. As described above, in order to transmit the optical signals utilizing the light bleeding and to cause the insulating layer L1b to function as the etching stopper, it is preferred to form the insulating layer L1b so as to have a thickness of about 10 nm.

Figure 8:
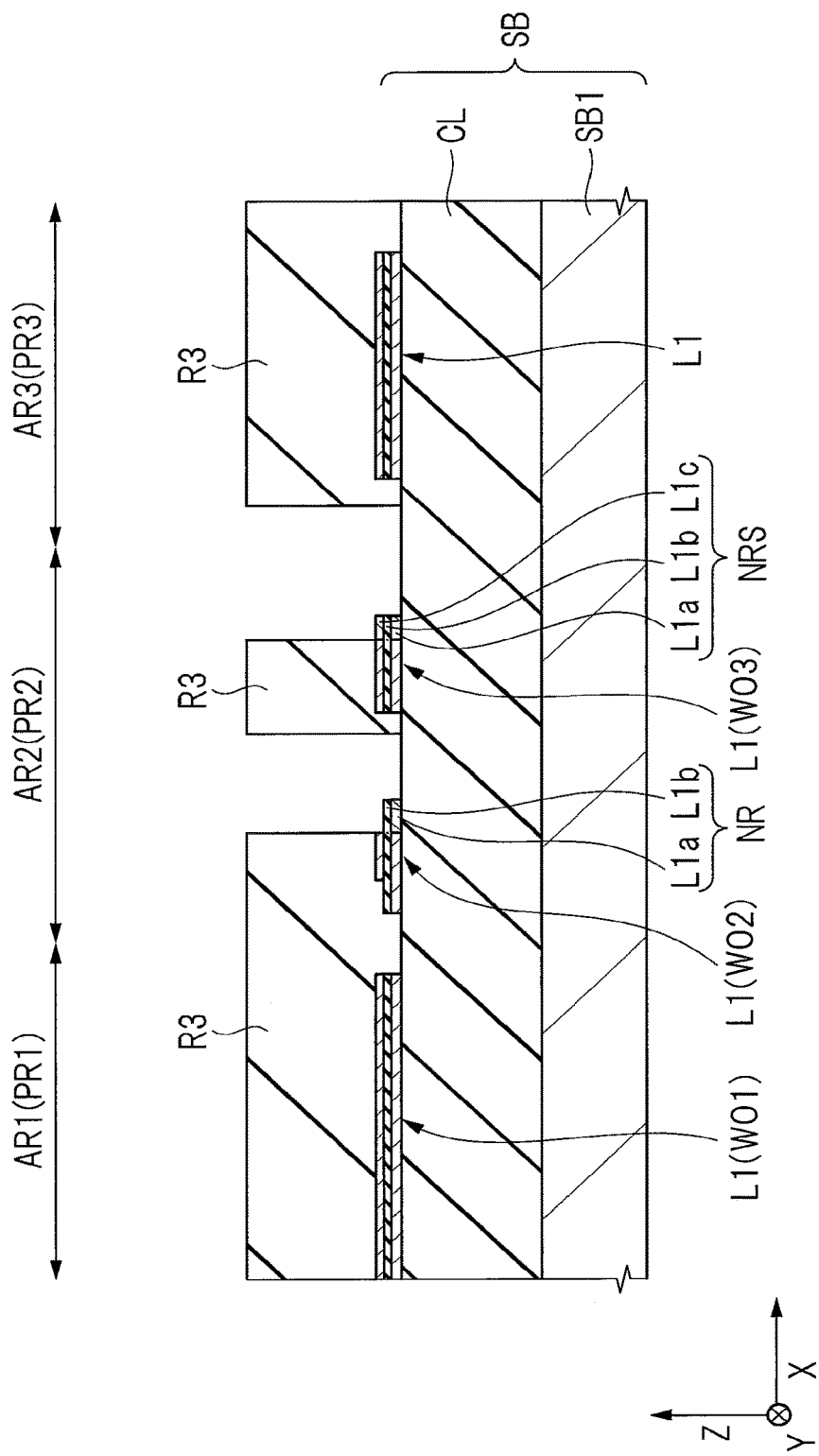
FIG. 8 is a cross-sectional view showing a step of manufacturing the semiconductor device of the first embodiment, continued from FIG. 6.
Figure 9:
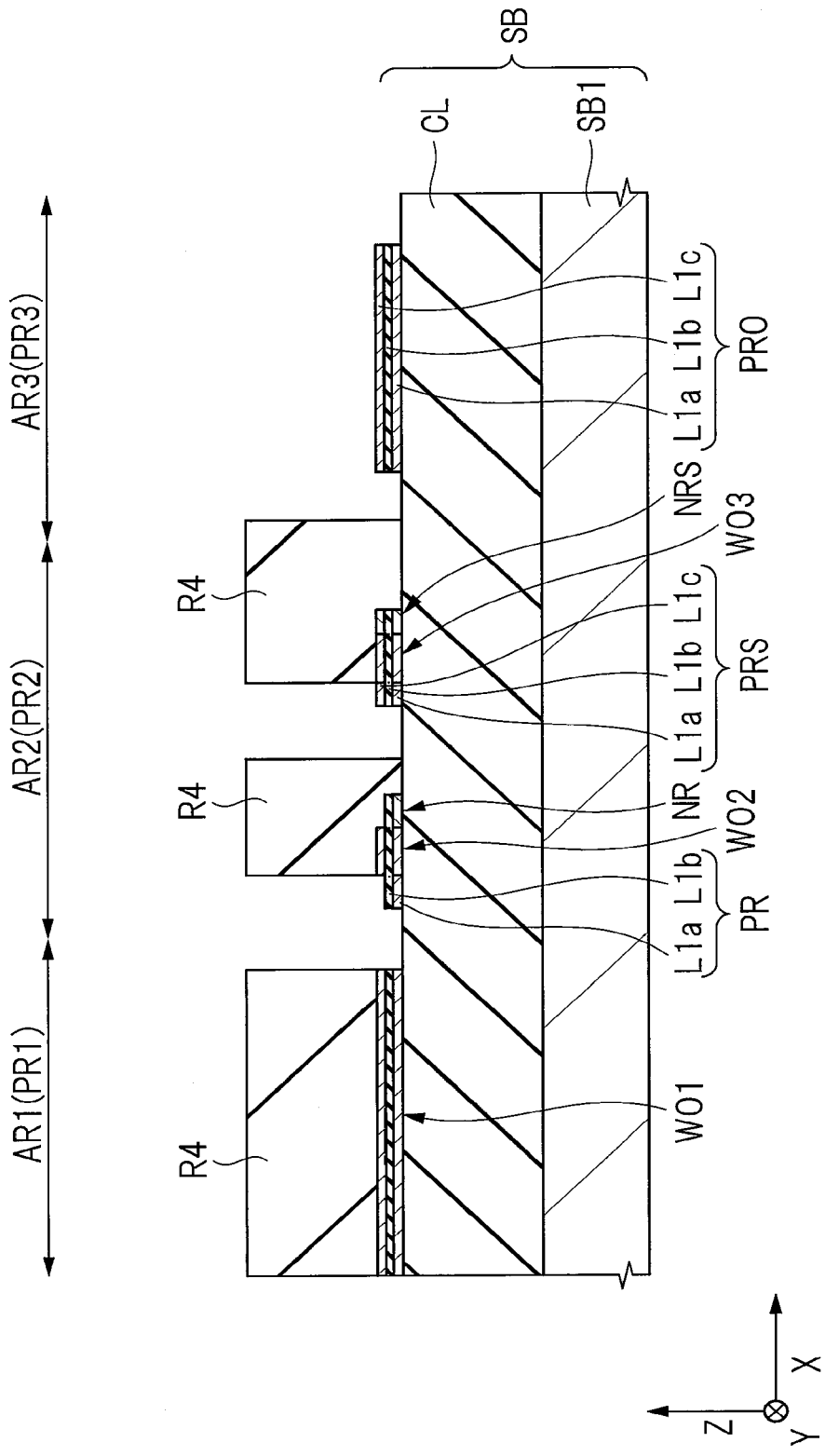
FIG. 9 is a cross-sectional view showing a step of manufacturing the semiconductor device of the first embodiment, continued from FIG. 8.

Then, as shown in FIGS. 8 and 9, impurity ions are implanted into the first semiconductor layers L1a on both sides of the optical waveguide WO2 to form the p-type semiconductor portion PR and the n-type semiconductor portion NR. Impurity ions are implanted also into the first semiconductor layers L1a on both sides of the optical waveguide WO3 to form the p-type semiconductor portion PRS and the n-type semiconductor portion NRS. Impurity ions are implanted also into the region AR3 to form the p-type semiconductor portion PRO.

First, as shown in FIG. 8, by using a photolithography method (light exposure and development), a photoresist film R3 is formed, the photoresist film R3 having an opening on an upper portion of the first semiconductor layer L1a on one side (e.g., right side in FIG. 8) of the optical waveguide WO2 and on an upper portion of the first semiconductor layer L1a on one side of the optical waveguide WO3. Then, n-type impurity ions are implanted while using the photoresist film R3 as a mask. In this manner, the n-type semiconductor portions NR and NRS are formed.

Then, the photoresist film R3 is removed by asking, etc. Then, as shown in FIG. 9, by using a photolithography method (light exposure and development), a photoresist film R4 is formed, the photoresist film R4 having an opening on an upper portion of the first semiconductor layer L1a on the other side (e.g., left side in FIG. 8) of the optical waveguide WO2, on an upper portion of the first semiconductor layer L1a on the other side of the optical waveguide WO3, and on an upper portion of the first semiconductor layer L1a in the photoelectric conversion portion PR3. Then, p-type impurity ions are implanted while using the photoresist film R4 as a mask. In this manner, the p-type semiconductor portions PR, PRS, and PRO are formed.

Note that, after the p-type and n-type impurities are implanted, the implanted impurities may be subjected to a heat treatment to be activated.

Figure 10:
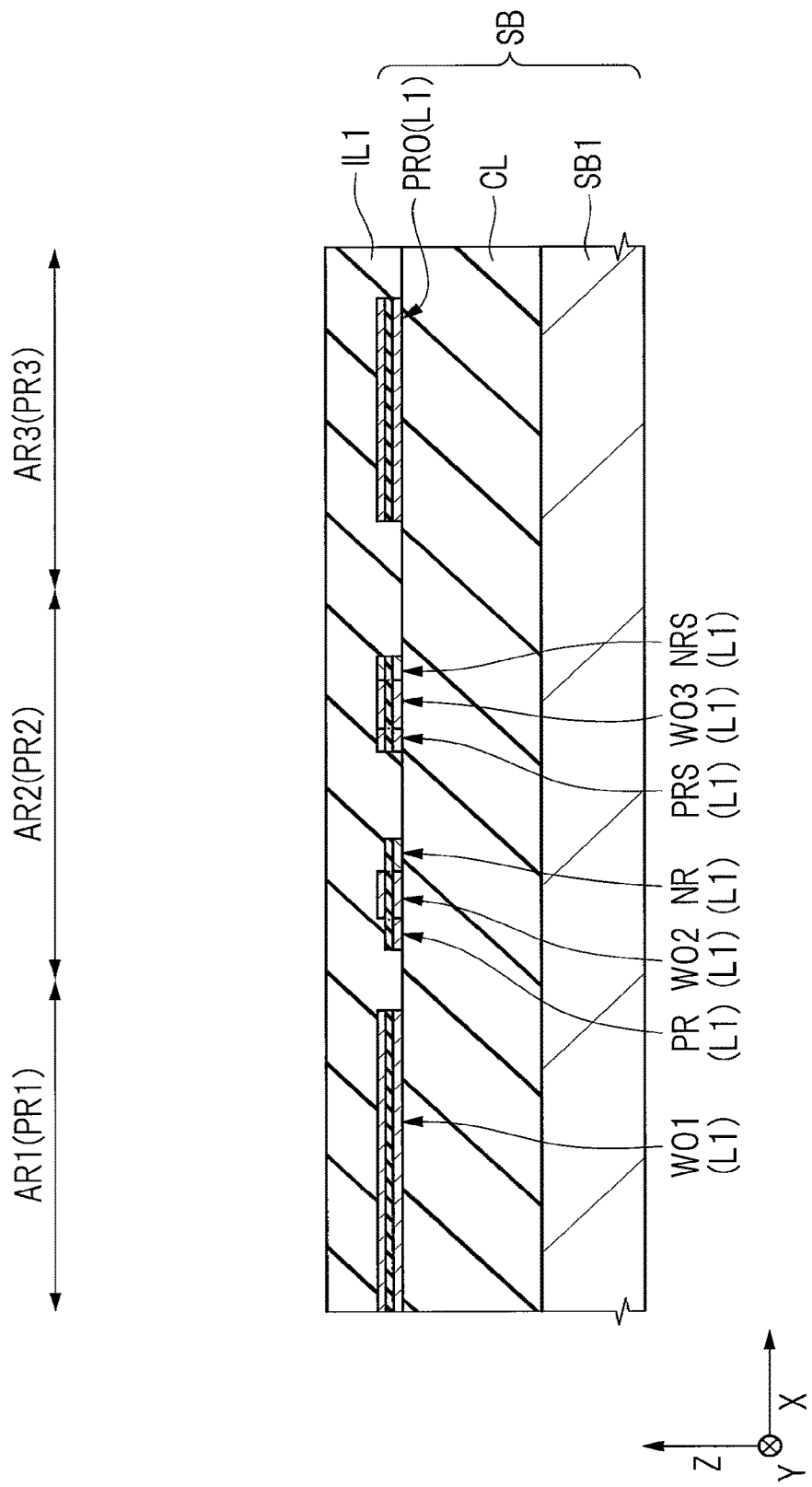
FIG. 10 is a cross-sectional view showing a step of manufacturing the semiconductor device of the first embodiment, continued from FIG. 9.

Then, as shown in FIG. 10, the interlayer insulating film IL1 is formed on the optical waveguides WO1, WO2, and WO3, p-type semiconductor portion PRO, etc. For example, a silicon oxide film is formed on the optical waveguides WO1, WO2, and WO3, p-type semiconductor portion PRO, etc., by a CVD (Chemical Vapor Deposition) method. Then, the top surface of the interlayer insulating film IL1 is smoothed as needed. For example, by a CMP (Chemical Mechanical Mechanical Polishing) method, etc., the top surface of the interlayer insulating film IL1 is polished to be smoothed.

Figure 11:
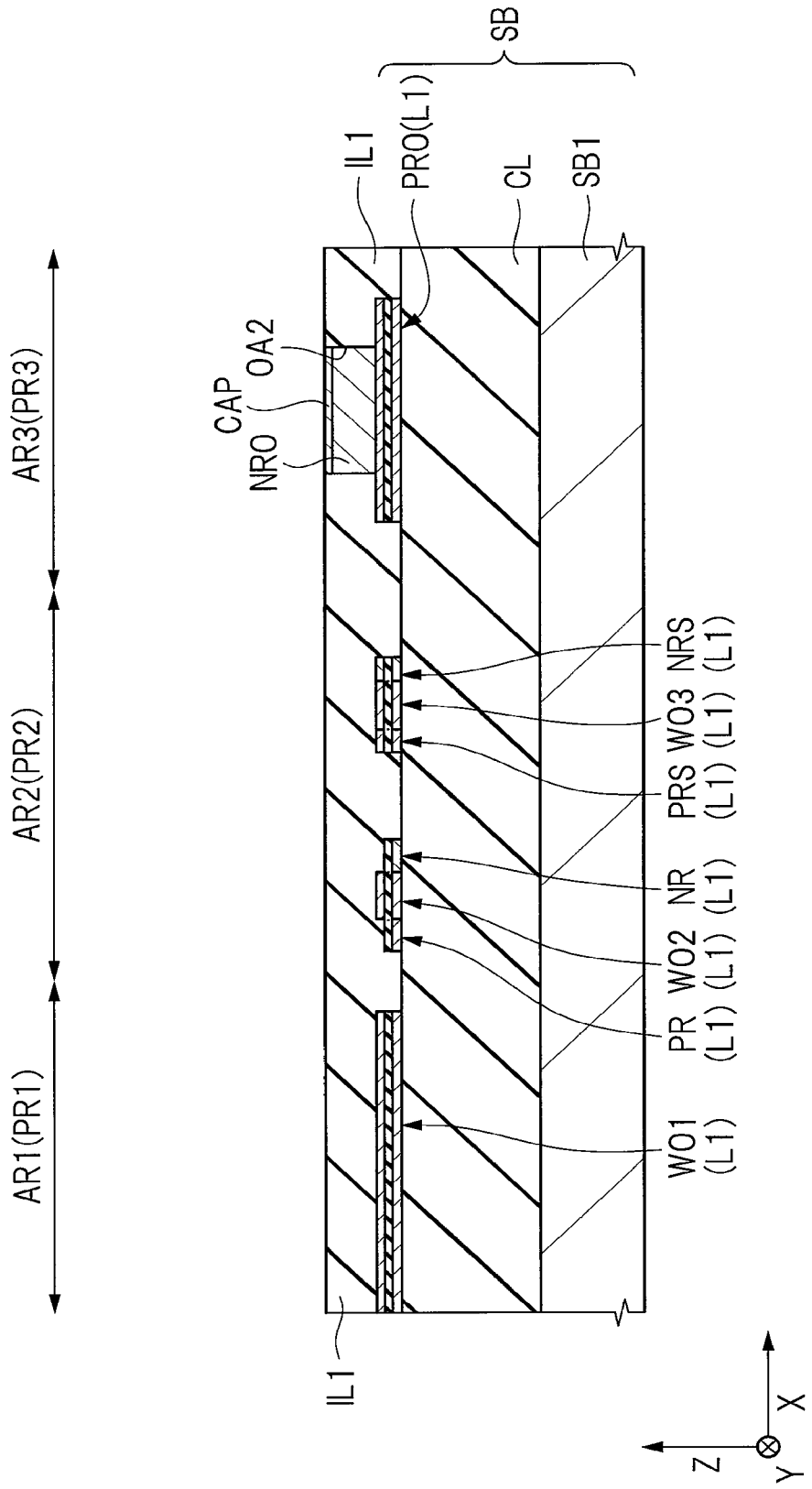
FIG. 11 is a cross-sectional view showing a step of manufacturing the semiconductor device of the first embodiment, continued from FIG. 10.

Then, as shown in FIG. 11, the n-type semiconductor portion NRO and the cap layer CAP are formed on the p-type semiconductor portion PRO.

First, by using a photolithography technique and an etching technique, the interlayer insulating film IL1 on the p-type semiconductor portion PRO is removed, so that the opening OA2 is formed on the p-type semiconductor portion PRO. From the bottom of this opening OA2, the p-type semiconductor portion PRO made of silicon is exposed. Then, the n-type semiconductor portion NRO made of Ge is formed on the exposed surface of the p-type semiconductor portion PRO. On the p-type semiconductor portion PRO, a semiconductor layer made of Ge is epitaxially grown as an n-type impurity is introduced. Note that an intrinsic semiconductor layer made of Ge may be epitaxially grown first, and then, an n-type impurity may be introduced by using an ion implantation method or others. In this manner, an element having a p/n junction structure formed of the p-type semiconductor portion PRO and the n-type semiconductor portion NRO made of Ge is formed.

Then, on the n-type semiconductor portion NRO, the cap layer CAP is formed. As described above, the cap layer CAP is formed in order to improve the surface roughness of Ge making up the n-type semiconductor portion NRO or to cover the film thickness. For example, on the n-type semiconductor portion NRO, an n-type silicon film is formed as the cap layer CAP. For example, on the n-type semiconductor portion NRO, a semiconductor layer made of silicon is epitaxially grown, and then, an n-type impurity is introduced into the semiconductor layer by an ion implantation method, so that the cap layer CAP is formed.

Figure 12:
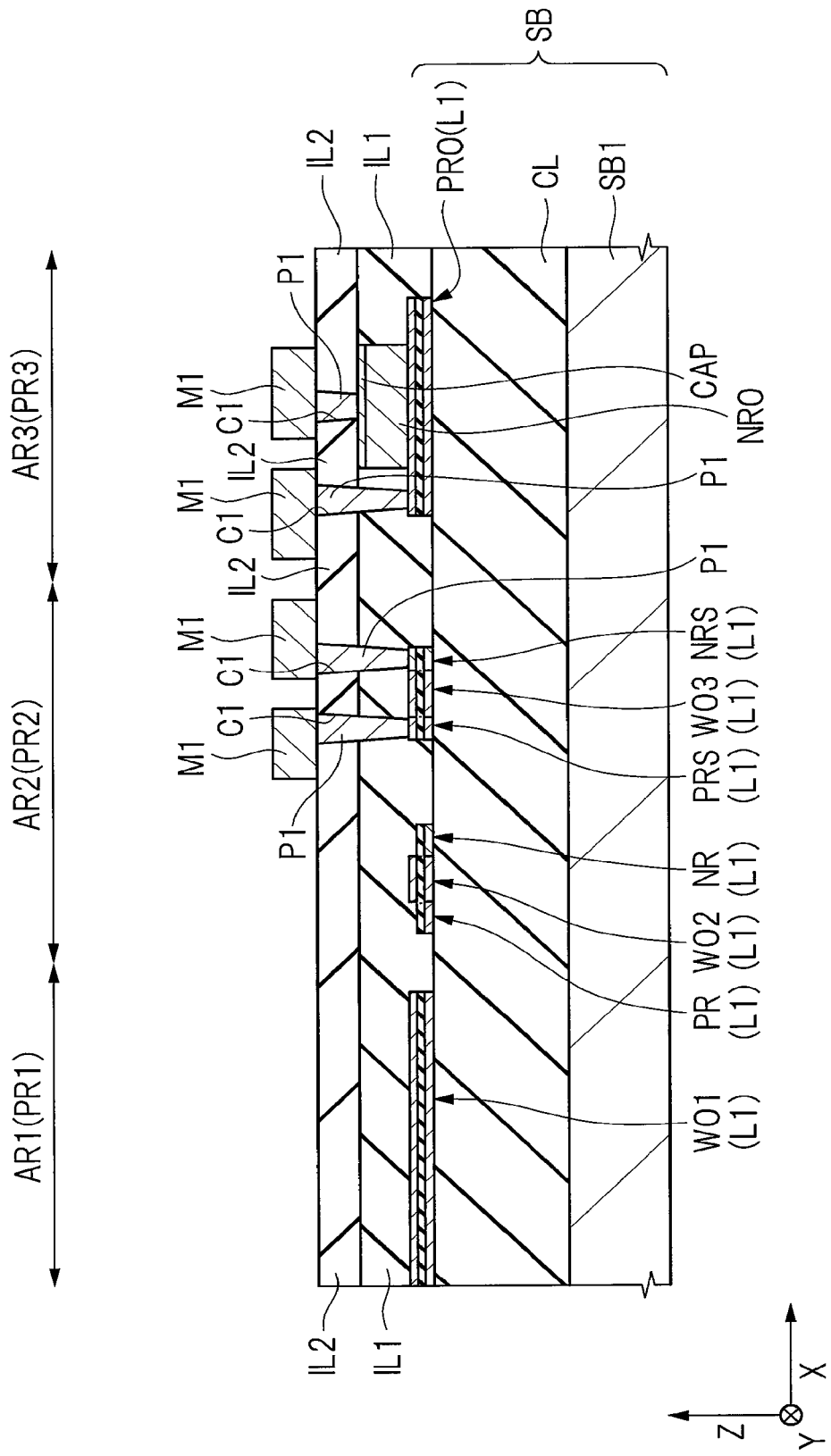
FIG. 12 is a cross-sectional view showing a step of manufacturing the semiconductor device of the first embodiment, continued from FIG. 11.

Then, as shown in FIG. 12, the interlayer insulating film IL2, the plug P1, and the wiring M1 are formed. First, on the interlayer insulating film IL1 and the cap layer CAP, the interlayer insulating film IL2 is formed. For example, on the interlayer insulating film IL1 and the cap layer CAP, a silicon oxide film is formed as the interlayer insulating film IL2 by a CVD method. In this manner, in the regions AR1, AR2, and AR3, the optical waveguides WO1 and WO2, the p-type semiconductor portion PR, the n-type semiconductor portion NR, the optical waveguide WO3, the p-type semiconductor portion PRS, the n-type semiconductor portion NRS, the p-type semiconductor portion PRO, and the n-type semiconductor portion NRO are surrounded by the interlayer insulating films IL1 and IL2 and insulating layer CL.

Then, by using a photolithography technique and an etching technique, the interlayer insulating films IL1 and IL2 on the p-type semiconductor portion PRS, n-type semiconductor portion NRS, p-type semiconductor portion PRO, and cap layer CAP are removed, so that contact holes C1 are formed on them. Although not shown in FIG. 12, the contact holes may be formed also on the p-type semiconductor portion PR and n-type semiconductor portion NR (see FIG. 3).

Then, a conductive film is buried inside the contact hole C1, so that the plug P1 is formed. For example, a tungsten film is formed by a sputtering method on the interlayer insulating film IL2 including the inside of the contact hole C1. Then, the tungsten film on the interlayer insulating film IL2 is removed by a CMP method, etc., so that the tungsten film can be buried inside the contact hole C1.

Then, a conductive film is formed on the plug P1 and is patterned, so that the wiring M1 is formed. For example, on the plug P1 and interlayer insulating film IL2, an aluminum-copper alloy film can be formed by a sputtering method. This aluminum-copper alloy film is patterned, so that the wiring M1 can be formed. Although the wiring M1 is formed by patterning here, note that the wiring M1 may be formed by the so-called damascene process. In this case, an insulating film having an opening (wiring trench) is formed on the plug P1, and a conductive film is buried inside the opening, so that the wiring M1 is formed.

Figure 13:
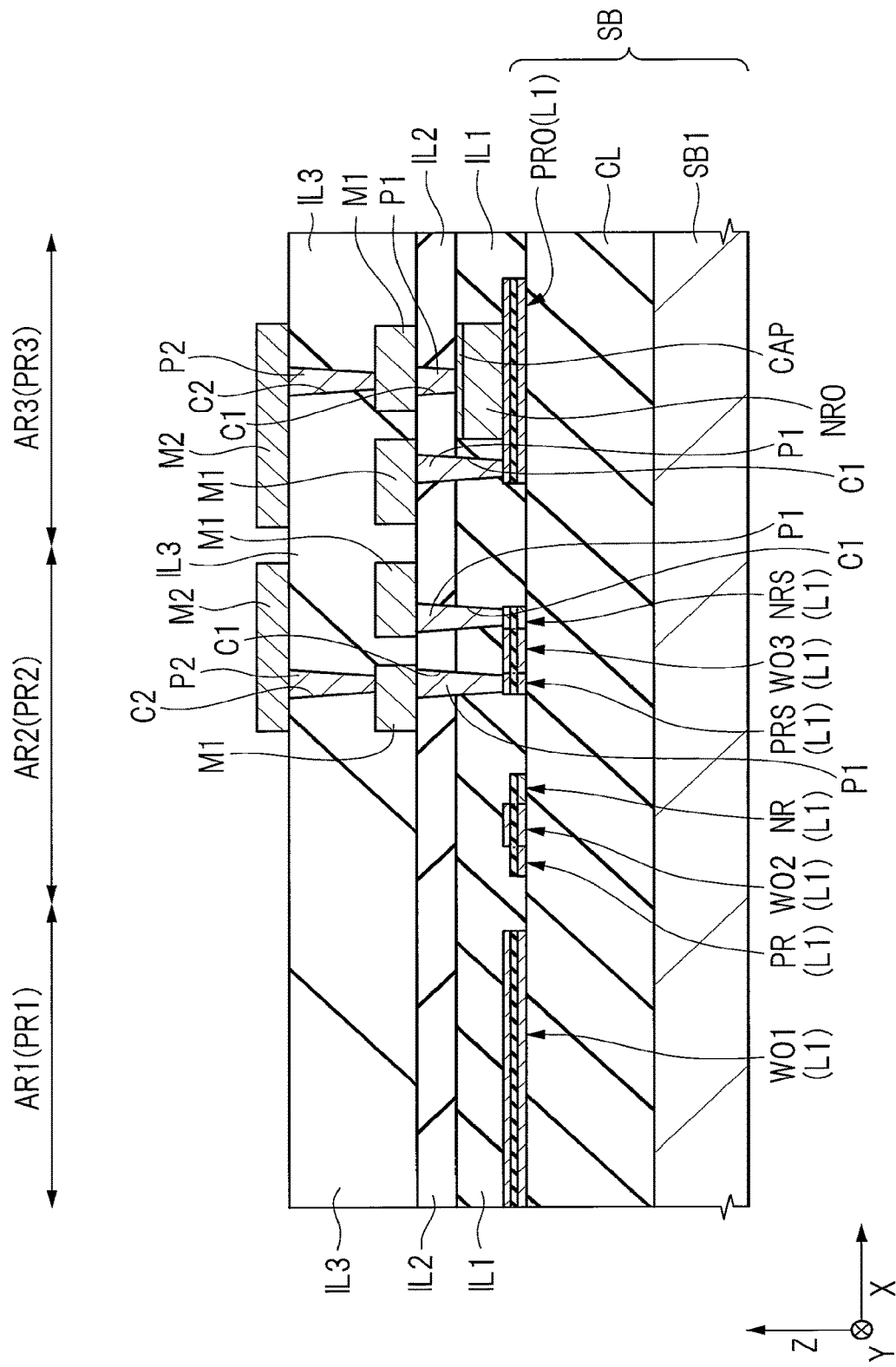
FIG. 13 is a cross-sectional view showing a step of manufacturing the semiconductor device of the first embodiment, continued from FIG. 12.

Then, as shown in FIG. 13, the interlayer insulating film IL3, the plug P2, and the wiring M2 are formed. First, on the interlayer insulating film IL2 and the wiring M1, the interlayer insulating film IL3 is formed. For example, on the interlayer insulating film IL2 and the wiring M1, a silicon oxide film is formed as the interlayer insulating film IL3 by a CVD method. Then, by using a photolithography technique and an etching technique, the interlayer insulating film IL3 on the wiring M1 is removed, so that the contact hole C2 is formed on the wiring M1. Then, a conductive film is buried inside the contact hole C2, so that the plug P2 is formed. For example, as similar to the case of the plug P1, the plug P2 can be formed. Then, the wiring M2 is then formed on the plug P2. For example, as similar to the case of the wiring M1, the wiring M2 can be formed. The wiring M2 may be formed by the so-called "damascene method". In this case, the plug P2 and the wiring M2 may be formed at the same time by the so-called "dual damascene method" by which the contact hole and the wiring trench are filled at the same time.

After that, the protective film TC is formed on the wiring M2, and then, the pad is formed. For example, first, on the interlayer insulating film IL3 and the wiring M2, a silicon oxynitride film is formed as the protective film TC by a CVD method. Then, by using a photolithography technique and an etching technique, the protective film TC on the wiring M2 is removed, so that the top surface of the wiring M2 is exposed. This exposed region of the wiring M2 serves as the pad portion (external connection region) OA1 (FIG. 1). Note that the configuration having the two-layer wirings (M1 and M2) below the protective film TC has been described here. However, a plurality of layered wirings may be formed.

By the above-described steps, the semiconductor device shown in FIG. 1 is formed.

(Method of Manufacturing SOI Substrate)

A method of forming the SOI substrate SB shown in FIG. 4 is not limited. However, for example, the SOI substrate can be manufactured as follows.

First Example

The SOI substrate SB can be manufactured by a bonding method. FIGS. 14 and 15 are cross-sectional views showing a first example of a method of manufacturing the SOI substrate of the present embodiment.

Figure 14A:
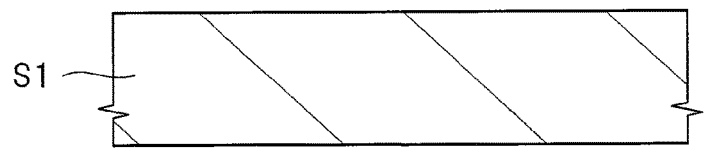
FIG. 14A is a cross-sectional view showing a first example of a method of manufacturing an SOI substrate of the first embodiment.
Figure 14B:
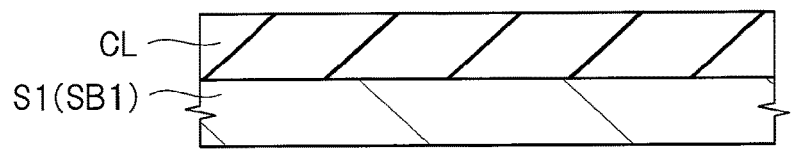
FIG. 14B is a cross-sectional view showing a first example of a method of manufacturing an SOI substrate of the first embodiment.
Figure 14C:
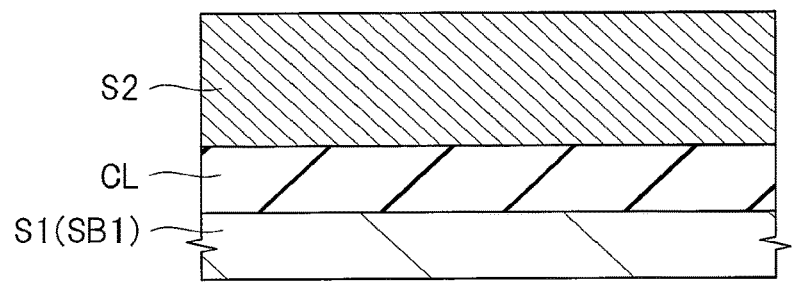
FIG. 14C is a cross-sectional view showing a first example of a method of manufacturing an SOI substrate of the first embodiment.
Figure 14D:
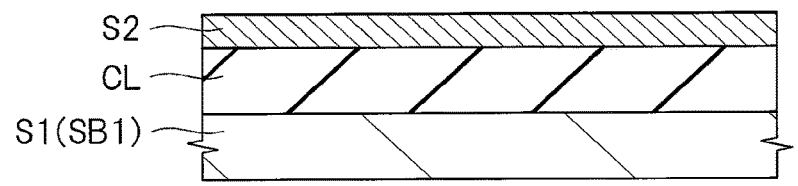
FIG. 14D is a cross-sectional view showing a first example of a method of manufacturing an SOI substrate of the first embodiment.

The top surface of a first silicon substrate S1 shown in FIG. 14A is oxidated to form the insulating layer CL formed of a silicon oxide film (FIG. 14). Then, as shown in FIG. 14C, a second silicon substrate S2 is compressively bonded under a high temperature to the top surface side of the first silicon substrate S1 via the insulating layer CL. In this manner, the first silicon substrate S1 and second silicon substrate S2 are bonded to each other via the insulating layer CL. After that, as shown in FIG. 14D, the second silicon substrate S2 is thinned while being set as a top surface by a CMP method, etc. In this case, the first silicon substrate S1 serves as the basic body SB1. On the insulating layer CL, a thin film of the second silicon substrate S2 remains. This thin film serves as the first semiconductor layer L1a. The thickness of the thin film (L1a) of the second silicon substrate S2 is set to be, for example, about 160 nm.

Figure 15A:
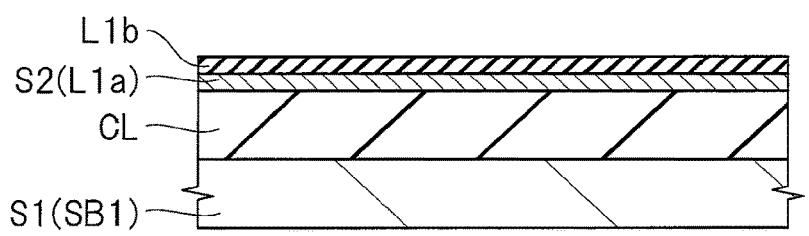
FIG. 15A is a cross-sectional view showing a first example of a method of manufacturing an SOI substrate of the first embodiment.

Then, as shown in FIG. 15A, the top surface of the thin film (L1a) of the second silicon substrate S2 is oxidized to form the insulating film L1b formed of a silicon oxide film. The thickness of the insulating film L1b is set to be, for example, about 10 nm. The silicon oxidation is accompanied with volume expansion, and therefore, note that it is preferred to adjust the thickness of the thin film of the second silicon substrate S2 in consideration of this volume expansion so that the oxide film on the top surface of the thin film (L1a) of the second silicon substrate S2 has a thickness of about 10 nm and so that the thin film (L1a) of the second silicon substrate S2 remaining below the oxide film has a thickness of about 150 nm.

Figure 15B:
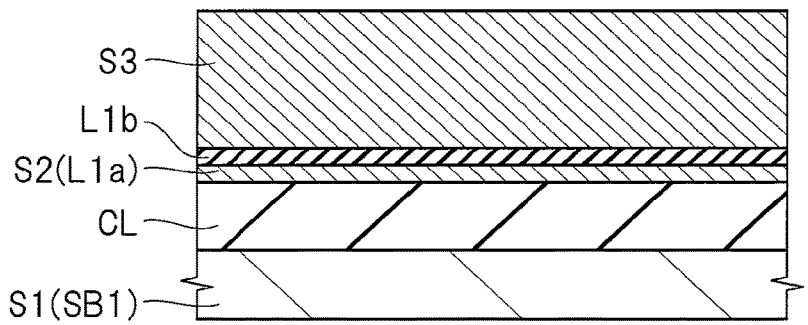
FIG. 15B is a cross-sectional view showing a first example of a method of manufacturing an SOI substrate of the first embodiment.
Figure 15C:
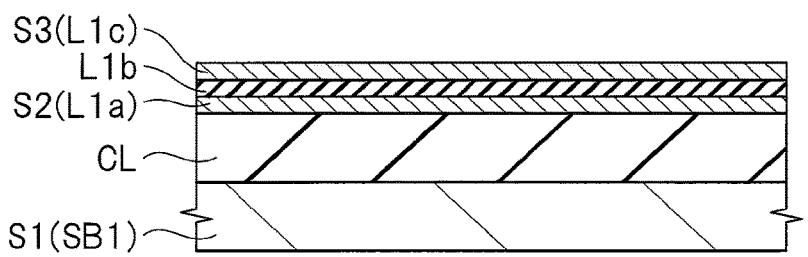
FIG. 15C is a cross-sectional view showing a first example of a method of manufacturing an SOI substrate of the first embodiment.

Then, as shown in FIG. 15B, a third silicon substrate S3 is compressively bonded under a high temperature to the top surface side of the thin film (L1a) of the second silicon substrate S2 via the insulating layer L1b. After that, as shown in FIG. 15C, the third silicon substrate S3 is thinned while being set as a top surface by a CMP method, etc. In this case, on the insulating layer L1b, a thin film of the third silicon substrate S3 remains. This thin film serves as the second semiconductor layer L1c. The thickness of the thin film (L1c) of the third silicon substrate S3 is set to be, for example, about 150 nm.

In this manner, the SOI substrate SB can be formed, the SOI substrate being obtained by forming the element forming layer L1 including the stacked body of the first semiconductor layer L1a, the insulating layer L1b, and the second semiconductor layer L1c on the basic body SB1 via the insulating layer CL.

Second Example

The insulating layer L1b may be formed by using a SIMOX (Silicon Implanted Oxide) method. FIGS. 16 and 17 are cross-sectional views showing a second example of the method of manufacturing the SOI substrate of the present embodiment.

Figure 16A:
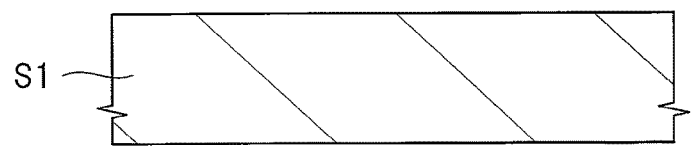
FIG. 16A is a cross-sectional view showing a second example of a method of manufacturing an SOI substrate of the first embodiment.
Figure 16B:
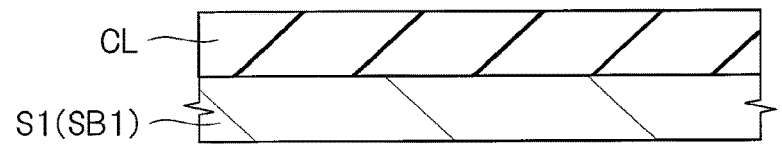
FIG. 16B is a cross-sectional view showing a second example of a method of manufacturing an SOI substrate of the first embodiment.
Figure 16C:
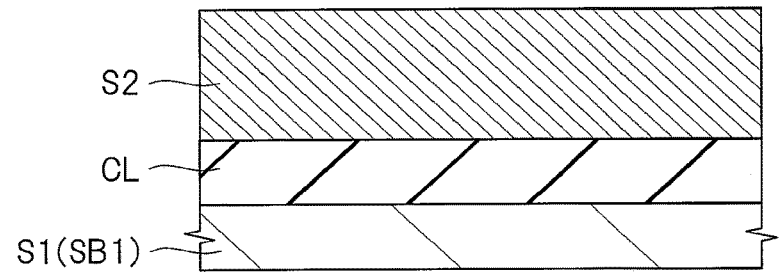
FIG. 16C is a cross-sectional view showing a second example of a method of manufacturing an SOI substrate of the first embodiment.
Figure 17A:
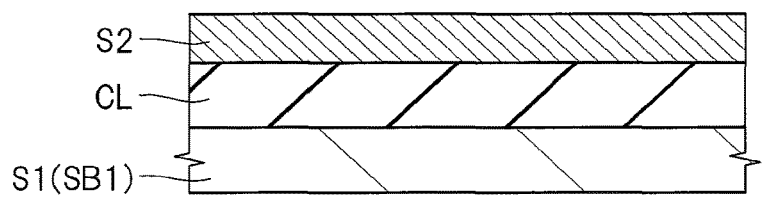
FIG. 17A is a cross-sectional view showing a second example of a method of manufacturing an SOI substrate of the first embodiment.

The top surface of the first silicon substrate S1 shown in FIG. 16A is oxidized to form the insulating layer CL formed of a silicon oxide film (FIG. 16B). Then, as shown in FIG. 16C, the second silicon substrate S2 is compressively bonded under a high temperature to the top surface side of the first silicon substrate S1 via the insulating layer CL. In this manner, the first silicon substrate S1 and the second silicon substrate S2 are bonded to each other via the insulating layer CL. After that, as shown in FIG. 17A, the second silicon substrate S2 is thinned while being set as a top surface by a CMP method, etc. In this case, the first silicon substrate S1 serves as the basic body SB1. On the insulating layer CL, a thin film of the second silicon substrate S2 remains. This thin film serves as the first semiconductor layers L1a and L1c. The thickness of the thin film (L1a) of the second silicon substrate S2 is set to be, for example, about 310 nm.

Figure 17B:
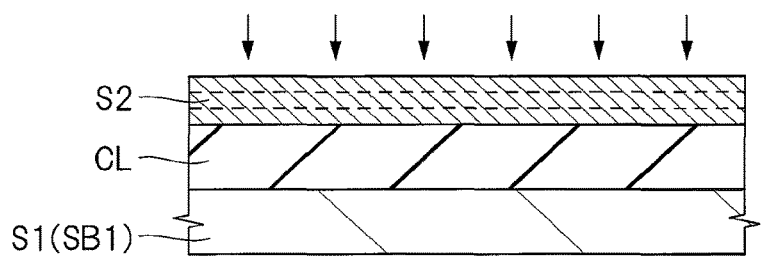
FIG. 17B is a cross-sectional view showing a second example of a method of manufacturing an SOI substrate of the first embodiment.
Figure 17C:
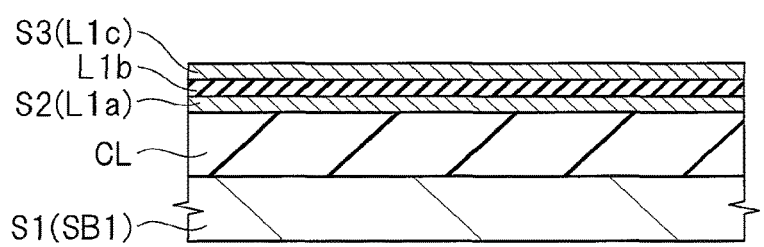
FIG. 17C is a cross-sectional view showing a second example of a method of manufacturing an SOI substrate of the first embodiment.

Then, as shown in FIG. 17B, oxygen ($O_2$) ions are implanted into the middle of the thin film of second silicon substrate S2 under a high energy condition. Then, as shown in FIG. 17C, by a heat treatment, the silicon and the implanted oxygen ions are coupled to each other to form the insulating layer L1b at a position slightly deeper than the top surface of the thin film of second silicon substrate S2. The position and volume of the implanted oxygen ions are adjusted so that the depth of the insulating layer L1b is at a position which is, for example, 150 to 160 nm deep from the top surface of the thin film of second silicon substrate S2 and so that the insulating layer L1b has a thickness of, for example, about 10 nm. An upper portion of this insulating layer L1b of the thin film of second silicon substrate S2 serves as the second semiconductor layer L1c, and a lower portion thereof serves as the first semiconductor layer L1a. A thickness of the second semiconductor layer L1 is about 150 nm, and a thickness of the first semiconductor layer L1a is about 150 nm.

In this manner, the SOI substrate SB can be formed, the SOI substrate being obtained by forming the element forming layer L1 including the stacked body of the first semiconductor layer L1a, the insulating layer L1b, and the second semiconductor layer L1c on the basic body SB1 via the insulating layer CL.

Note that the substrate in the state shown in FIG. 17A may be formed by using the SIMOX method. That is, the insulating layer CL formed of the silicon oxide film may be formed by ion-implanting oxide ($O_2$) to the middle of the silicon substrate under a high energy condition, and then, performing a heat treatment thereto.

Second Embodiment

In the present embodiment, various application examples of the configuration of the semiconductor device of the first embodiment will be descried.

First Application Example

Figure 18:
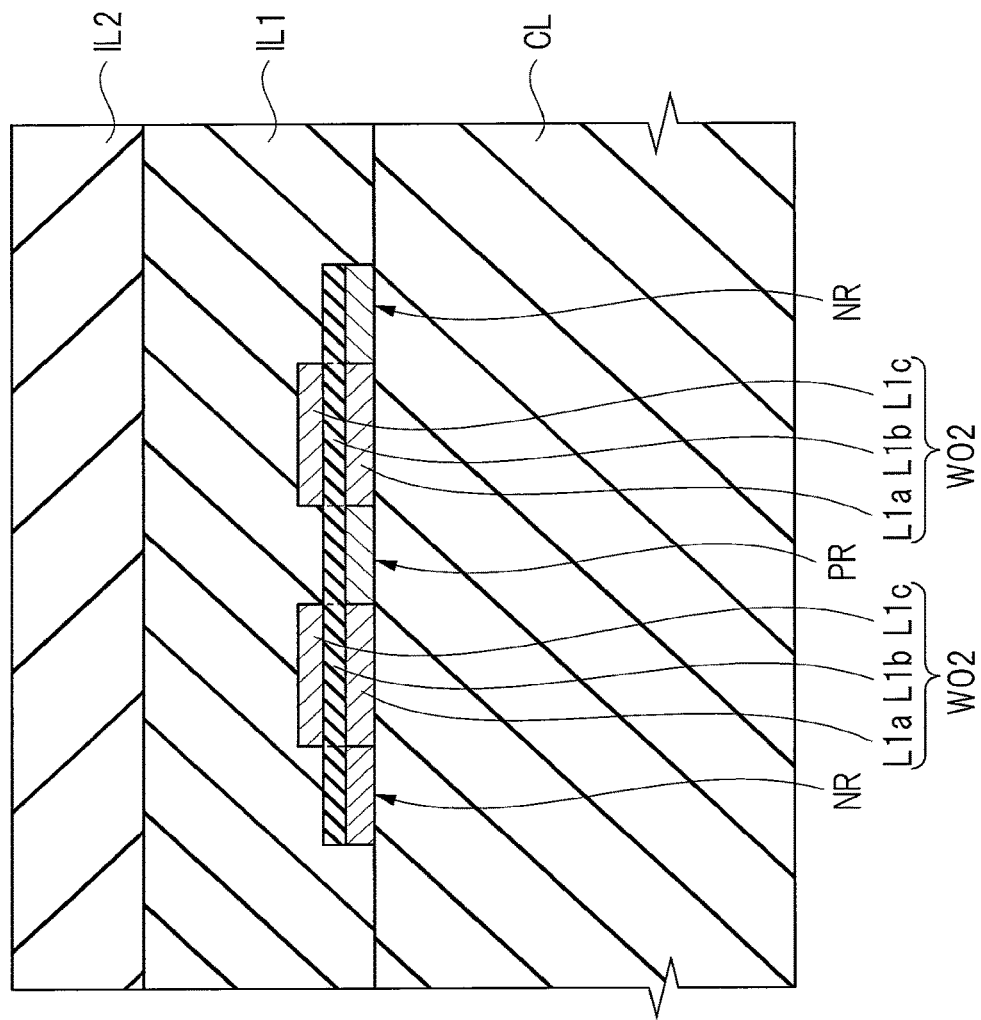
FIG. 18 is a cross-sectional view showing a configuration of a rib-type element of a semiconductor device of a first application example of a second embodiment.

In the first embodiment (FIG. 2), one optical waveguide that is the convex portion with a large film thickness is provided in the rib-type (convex-type) element (WO2, PR, NR). However, two convex portions (optical waveguides) may be provided therein. FIG. 18 is a cross-sectional view showing a configuration of the rib-type element of the semiconductor device of the first application example of the present embodiment.

As shown in FIG. 18, each of two optical waveguides WO2 is formed of the first semiconductor layer L1a formed on the insulating layer LC, the insulating layer L1b formed on the first semiconductor layer L1a, and the second semiconductor layer L1c formed on the insulating layer L1b.

The semiconductor portions (PR, NR) are provided on both sides of one optical waveguide WO2, and the semiconductor portions (PR, NR) are provided on the both sides of the other optical waveguide WO2. The semiconductor portion PR is formed between one optical waveguide WO2 and the other waveguide WO2.

Second Application Example

Figure 19:
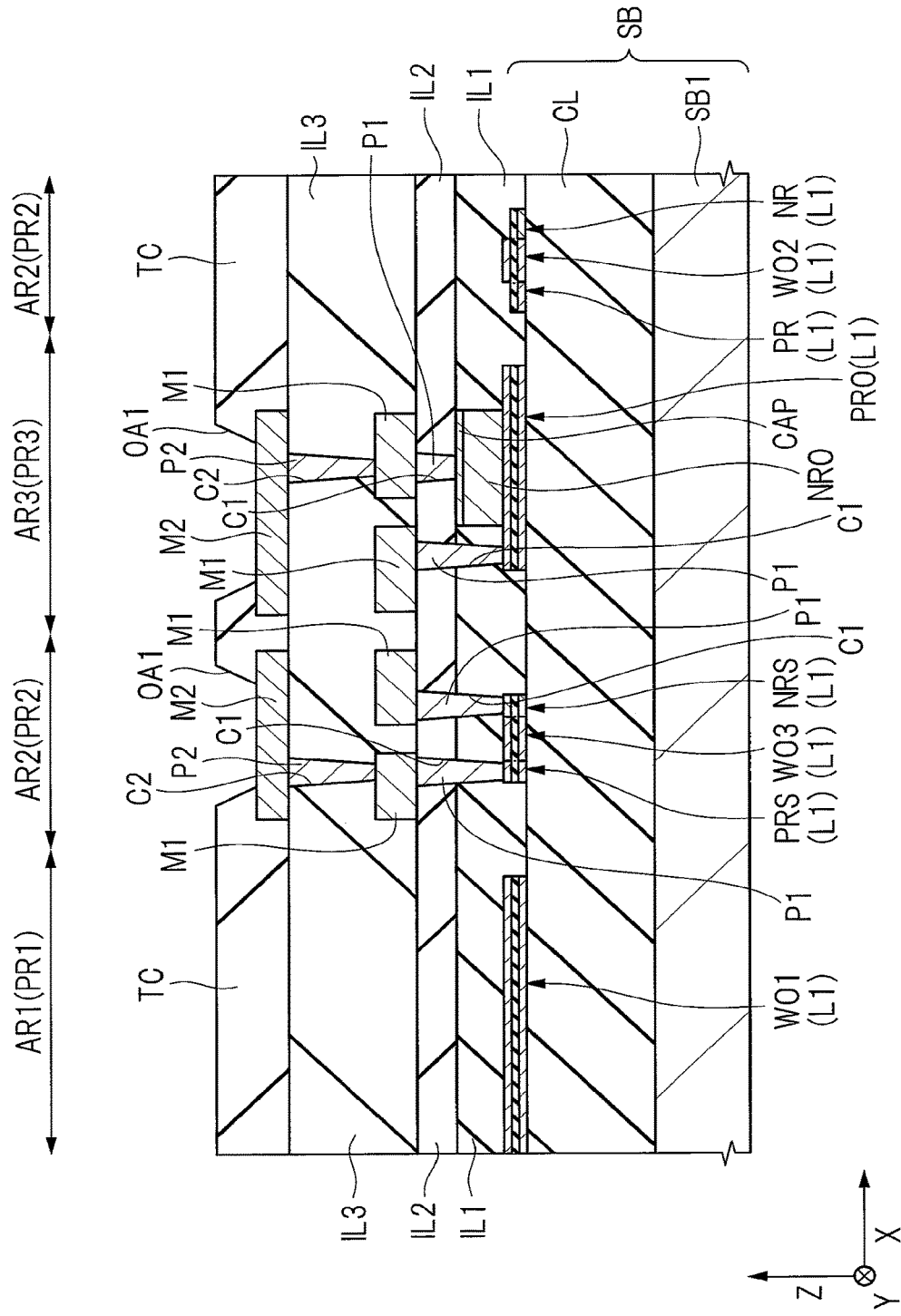
FIG. 19 is a cross-sectional view showing a configuration of a semiconductor device of a second application example of the second embodiment.

In the first embodiment (FIG. 1), the rib-type (convex-type) element is arranged on a portion of the region AR2 on the region AR1 side. However, the arrangement is not limited to such a layout. FIG. 19 is a cross-sectional view showing a configuration of a semiconductor device of a second application example of the present embodiment.

In the semiconductor device shown in FIG. 19, the rib-type (convex-type) element is arranged in an outside (right side in FIG. 19) of the region AR3. Note that the configurations of the optical signal transmission line portion PR1, the optical modulation portion PR2, and the photoelectric conversion portion PR3 that are arranged in each region (AR1, AR2, and, AR3) are the same as those in the case of the first embodiment, and therefore, the description thereof will be omitted.

Third Application Example

Figure 20:
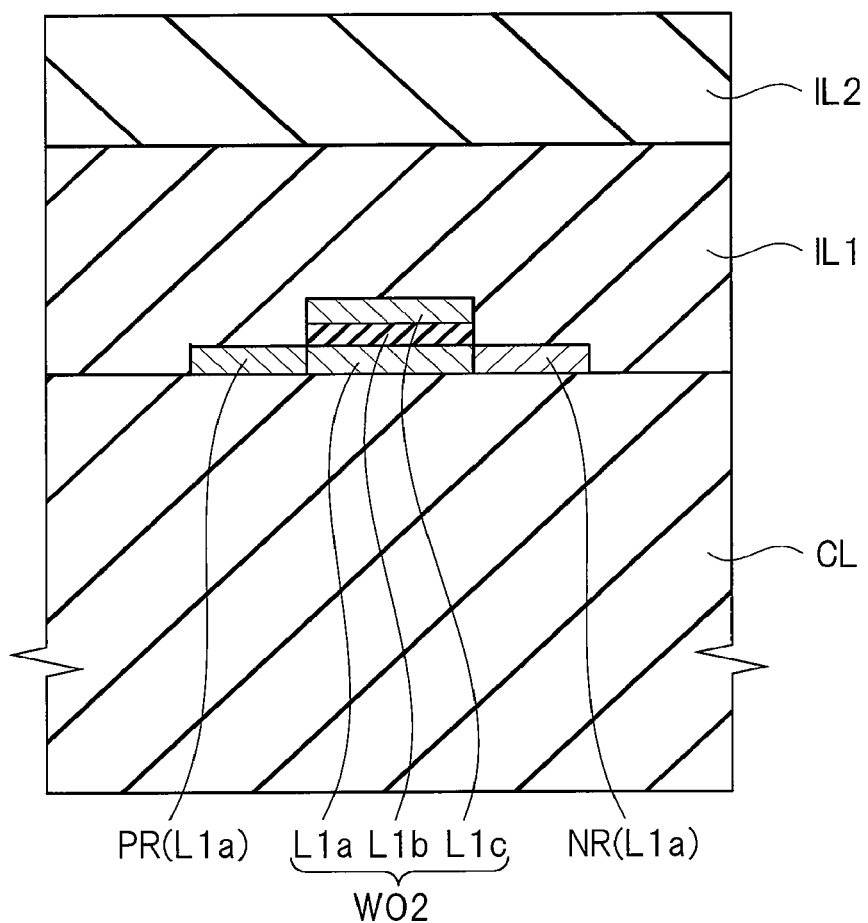
FIG. 20 is a cross-sectional view showing a configuration of a rib-type element of a semiconductor device of a third application example of the second embodiment.

In the first embodiment (FIG. 2), the insulating film L1b is left on the p-type semiconductor portion PR and n-type semiconductor portion NR that make up the rib-type (convex-type) element (WO2, PR, NR). However, this insulating film L1b may be removed. FIG. 20 is a cross-sectional view showing a configuration of a rib-type element of a third application example of the present embodiment.

As shown in FIG. 20, the insulating film L1b on the p-type semiconductor portion PR and n-type semiconductor portion NR is removed, so that the top surfaces of the semiconductor portions PR and NR are covered with the interlayer insulating film IL1.

For example, as similar to the first embodiment, the second semiconductor layer L1c making up the uppermost layer of the three layers making up the optical waveguide WO2 is etched while using the insulating layer L1b as an etching stopper, and then, the exposed insulating layer L1b is etched until the first semiconductor layer L1a is exposed. This etching is performed under an etching condition in which silicon oxide is easy to be etched while silicon is difficult to be etched. That is, an etching selectivity (etching rate of the insulating layer L1b/etching rate of the first semiconductor layer L1a) is set to be large. In this manner, the insulating layer L1b may be removed. Also in this case, the etching process can be easily stopped by the first semiconductor layer L1a below the insulating layer L1b.

Fourth Application Example

Figure 21:
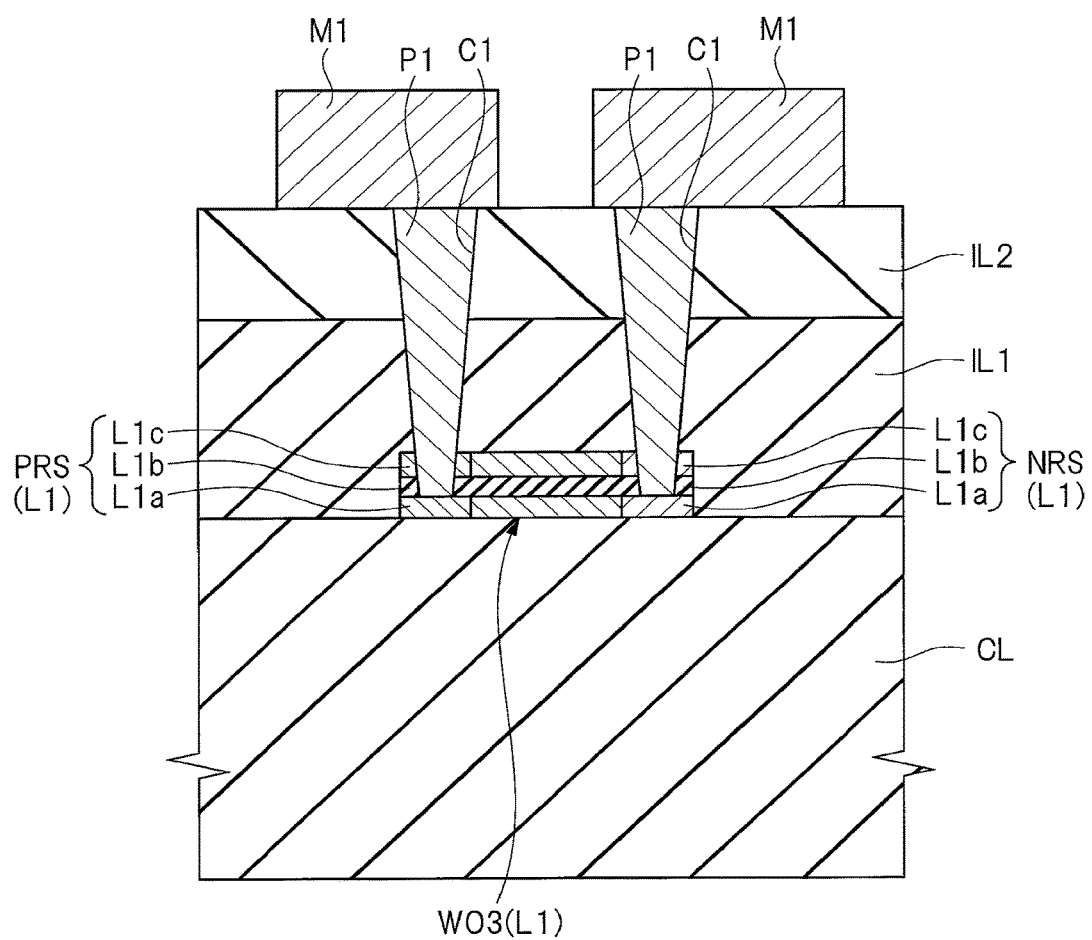
FIG. 21 is a cross-sectional view showing a configuration of a semiconductor device of a fourth application example of the second embodiment.

In the first embodiment (FIG. 1), the semiconductor portions (PRS, NRS) are provided on both sides of the optical waveguide WO3, and the plug P1 is provided on the second semiconductor layer L1c containing the impurity in the semiconductor portion (PRS, NRS). However, the plug P1 may be provided on the first semiconductor layer L1a containing the impurity. FIG. 21 is a cross-sectional view showing a configuration of a semiconductor device of a fourth application example of the present embodiment.

As shown in FIG. 21, the plug P1 is formed of a conductive film buried in each contact hole C1 provided on the semiconductor layer L1a. This contact hole C1 penetrates through the interlayer insulating films IL1 and IL2, second semiconductor layer L1c, and insulating layer L1b on the first semiconductor layer L1a, and reaches the first semiconductor layer L1a. The plug P1 formed of the conductive film buried in such a contact hole C1 has a bottom surface in contact with the first semiconductor layer L1a and aside surface in contact with the second semiconductor layer L1c.

In this manner, for example, a potential applied through the plug P1 reaches not only the second semiconductor layer L1c but also the first semiconductor layer L1a.

The above-described plug P1 can be formed as follows. First, the interlayer insulating films IL1 and IL2 on the p-type semiconductor portion PRS and the n-type semiconductor portions NRS, the second semiconductor layer L1c, and the insulating layer L1b are removed by a photolithography technique and an etching technique, so that the contact hole C1 is formed on these layers. Then, the contact hole C1 is buried inside the conductive film, so that the plug P1 is formed. For example, by a sputtering method, a tungsten film is formed on the interlayer insulating film IL2 including the inside of the contact hole C1. Then, the tungsten film on the interlayer insulating film IL2 is removed by a CMP method, etc., so that the tungsten film can be buried inside the contact hole C1.

Fifth Application Example

In the first embodiment (FIG. 2), the optical waveguide WO2 making up the rib-type (convex-type) element is formed of the stacked body (L1) of the first semiconductor layer L1a, the insulating layer L1b, and the second semiconductor layer L1c, that is, formed of the three layer films. However, the optical waveguide WO2 may be formed of five or more layer films. FIGS. 22 and 23 are cross-sectional views showing components of a semiconductor device of a fifth application example of the present embodiment.

Figure 22A:
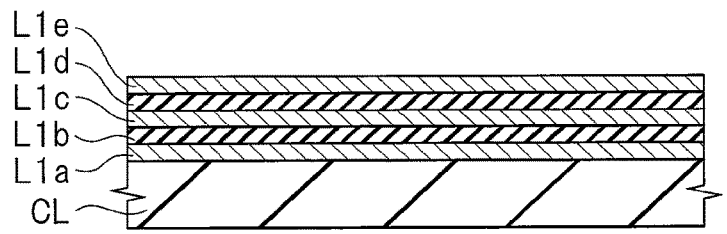
FIG. 22A is a cross-sectional view showing a configuration portion of a semiconductor device of a fifth application example of the second embodiment.
Figure 22B:
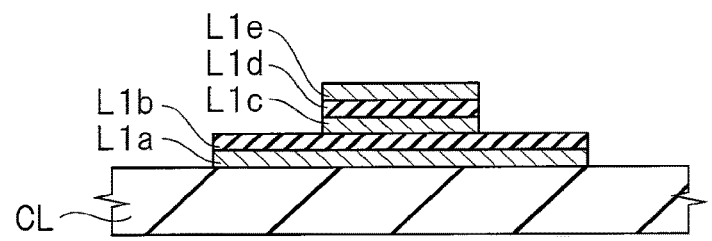
FIG. 22B is a cross-sectional view showing a configuration portion of a semiconductor device of a fifth application example of the second embodiment.

As shown in FIG. 22A, the element forming layer L1 of the SOI substrate SB is formed of a stacked body of the first semiconductor layer L1a, the thin insulating layer L1b on the first semiconductor layer L1a, the second semiconductor layer L1c on the insulating layer L1b, a thin insulating layer L1d on the second semiconductor layer L1c, and a third semiconductor layer L1e on the insulating layer L1d. For example, each of the semiconductor layers L1a, L1c, and L1e is made of silicon having a thickness of about 150 nm, and each of the thin insulating layers L1b and L1d is made of silicon oxide having a thickness of about 10 nm. Note that each thickness of the semiconductor layers L1a, L1c, and L1e may be changed.

Out of the five layer films making up the optical waveguide WO2, upper three layer films are etched. When the second semiconductor layer L1c is etched in this etching process, the insulating layer L1b which is the lower layer plays a role of an etching stopper.

In this manner, by forming the element forming layer L1 as the stacked body obtained by alternately stacking a plurality of semiconductor layers and thin insulating layers, the film thickness ratio between the optical waveguide WO2 and the semiconductor portions (PR, NR) on the both ends of the optical waveguide WO2 can be changed.

Figure 23A:
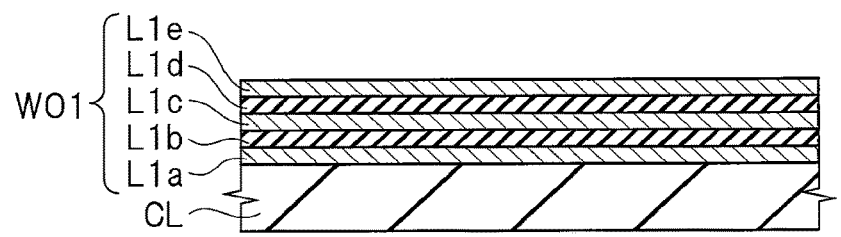
FIG. 23A is a cross-sectional view showing a configuration portion of a semiconductor device of a fifth application example of the second embodiment.

As shown in FIG. 23A, the optical waveguide WO2 and another optical waveguide (e.g., WO1) may have the same film composition as each other. In other words, their film thicknesses may be the same as each other.

Figure 23B:
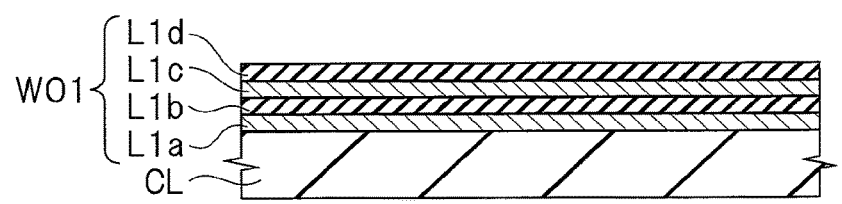
FIG. 23B is a cross-sectional view showing a configuration portion of a semiconductor device of a fifth application example of the second embodiment.

As shown in FIG. 23B, the film thickness ratio between the optical waveguide WO2 and another optical waveguide (e.g., WO1) may be changed.

In this manner, according to the present application example, the film thickness of the portion making up the element can have a large variation in accordance with the characteristics of the element.

The present application example may have a configuration in which the optical waveguide WO3 and semiconductor portions (PRS, PRN) are formed of five layer films so that the plug P1 has a bottom surface in contact with the first semiconductor layer L1a and aside surface in contact with the second semiconductor layer L1c and with the third semiconductor layer L1e as similar to the fourth application example.

Sixth Application Example

Figure 25:
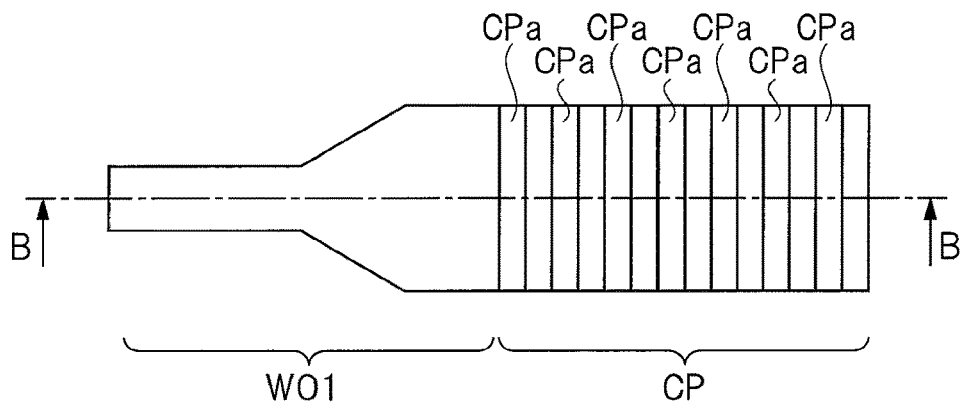
FIG. 25 is a plan view showing the configuration of the semiconductor device of the sixth application example of the second embodiment.

In the first embodiment (FIG. 2), the rib-type (convex-type) element (the diode having the pin structure) is provided as the element having portions with different film thicknesses from each other. However, for example, a grating coupler may be provided. FIG. 24 is a cross-sectional view of a configuration showing a semiconductor device of a sixth application example of the present embodiment, and FIG. 25 is a plan view thereof. For example, the cross-sectional view of FIG. 24 corresponds to a B-B cross-sectional surface of FIG. 25.

As shown in FIG. 24, for example, a grating coupler CP connected to an end of the optical waveguide WO1 is provided in the region AR2.

As shown in FIG. 24, the optical waveguide WO1 is formed of the first semiconductor layer L1a formed on the insulating layer LC, the insulating layer L1b formed on the first semiconductor layer L1a, and the second semiconductor layer L1c formed on the insulating layer L1b. For example, each of the first semiconductor layers L1a and second semiconductor layer L1c is made of silicon having a thickness of about 150 nm, and the thin insulating layers L1b is made of silicon oxide having a thickness of about 10 nm. Here, the insulating layer L1b is extremely thin (e.g., 10 nm in thickness), and therefore, does not affect the optical signal transmission. The optical waveguide WO1 is formed into, for example, a linear shape extending in the X direction (rectangular shape having long sides extending in the X direction).

The grating coupler (functional film) CP has a plurality of convex portions (ribs) CPa arranged obtained by placing the convex portions at a predetermined interval. A portion between these convex portions CPa becomes a concave portion.

Each convex portion (rib) CPa is formed of the first semiconductor layer L1a formed on the insulating layer LC, the insulating layer L1b formed on the first semiconductor layer L1a, and the second semiconductor layer L1c formed on the insulating layer L1b. Here, the insulating layer L1b is extremely thin (e.g., 10 nm in thickness), and therefore, does not affect the optical signal transmission.

The plurality of convex portions (ribs) CPa are formed so as to, for example, be on a line extending in the Y direction (rectangular shape having long sides extending in the Y direction) and be placed in the X direction at a predetermined interval (FIG. 25). In other words, each plane shape of the convex and concave portions has a linear shape extending in the Y direction (rectangular shape having long sides extending in the Y direction), and the convex and concave portions are alternately arranged in the X direction.

The portion (concave portion) between the convex portions is formed of the first semiconductor layer L1a formed on the insulating layer LC and the insulating layer L1b formed on the first semiconductor layer L1a. In this manner, the film thickness of the concave portion (L1a, L1b) is smaller than the film thickness of the convex portion (L1a, L1b, L1c). In the concave portion, note that the insulating layer L1b on the first semiconductor layer L1a may be removed.

The grating coupler (functional film) CP can be formed as similar to the rib-type (convex-type) element of the first embodiment. For example, the second semiconductor layer L1c is etched while using the first photoresist film in each forming region of the convex portion CPa and optical waveguide WO1 as a mask, and then, the insulating layer L1b and first semiconductor layer L1a are etched while using the second photoresist film in each forming region of the convex portion CPa, optical waveguide WO1, and concave portion as a mask.

Figure 26A:
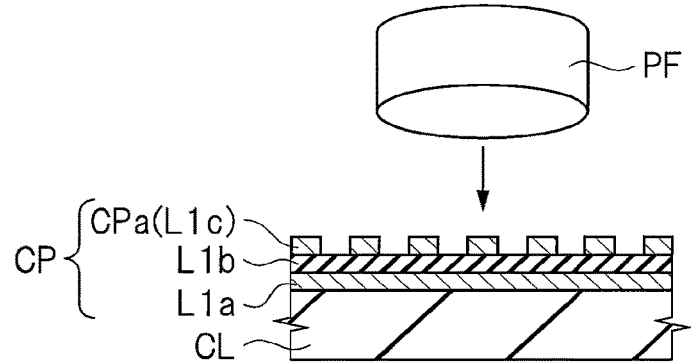
FIG. 26A is a diagram schematically showing optical signal exchange by a grating coupler.
Figure 26B:
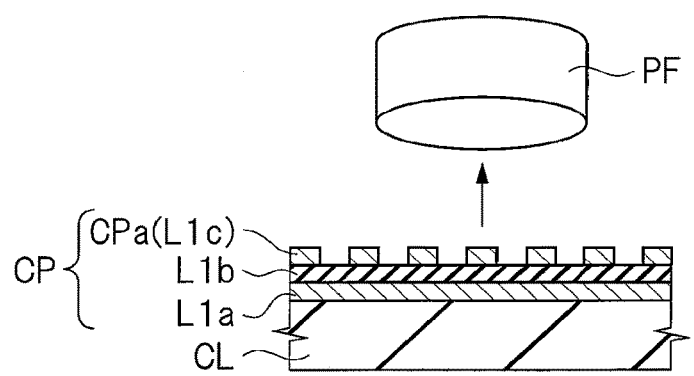
FIG. 26B is a diagram schematically showing optical signal exchange by a grating coupler.

The grating coupler CP is an element that receives and outputs optical signals. Therefore, the grating coupler CP is used as a light inputting unit or light outputting unit. An optical signal is radiated while diffracting in a specific direction by a periodic refractive index modulator (formed of surface unevenness) formed on the optical waveguide surface along a propagation direction. FIGS. 26A and 26B are diagrams schematically showing optical signal exchanges based on the grating coupler. As shown in FIG. 26A, an optical signal input from an optical fiber PF is radiated while diffracting in a specific direction (e.g., into the optical waveguide WO1) by the periodic refractive index modulator. As shown in FIG. 26B, an optical signal output from the optical waveguide WO1 is radiated while diffracting in a specific direction (e.g., toward the optical fiber PF) by the periodic refractive index modulator.

On the optical waveguide WO1 and grating coupler CP, the interlayer insulating films IL1 and IL2 are formed. Note that the interlayer insulating film (IL3) and protective film (TC) may be formed on the interlayer insulating film IL2. The protective film (TC) on the grating coupler CP which inputs/outputs the optical signals to/from outside may not be eliminated.

In the foregoing, the invention made by the present inventors has been concretely described based on the embodiments. However, it is needless to say that the present invention is not limited to the foregoing embodiments and various modifications and alterations can be made within the scope of the present invention.

[Additional Note 1]

A method of manufacturing a semiconductor device includes: (a) a step of preparing a semiconductor substrate including a basic body, an insulating layer formed on the basic body, and an element forming layer formed on the insulating layer; and (b) a step of forming an optical waveguide and a first semiconductor portion connected to the optical waveguide by patterning the element forming layer. In the step of (a), the element forming layer includes: a first layer made of a semiconductor formed on the insulating layer; a second layer made of an insulator formed on the first layer; and a third layer made of a semiconductor formed on the second layer. In the step of (b), the optical waveguide includes: a first portion made of a semiconductor formed on the insulating layer; a second portion made of an insulator formed on the first layer; and a third portion made of a semiconductor formed on the second layer, and the first semiconductor portion includes a fourth portion in the same layer as that of the first portion. The step of (b) includes: (b1) a step of etching the third layer while using a first mask film on a forming region of the third portion as a mask; and (b2) a step of etching the second layer and the first layer while using a second mask film on each forming region of the first portion and the fourth portion as a mask.

[Additional Note 2]

In the method of manufacturing the semiconductor device described in the additional note 1, a step of forming the element forming layer in the step of (a) includes: (a1) a step of bonding a substrate made of a semiconductor onto the first layer formed the insulating layer via the second layer; and (a2) a step of forming the third layer by thinning the substrate.

[Additional Note 3]

In the method of manufacturing the semiconductor device described in the additional note 1, a step of forming the element forming layer in the step of (a) includes: (a1) a step of injecting oxygen into middle of a layer made of a semiconductor formed on the insulating layer; and (a2) after the step of (a1), a step of forming an oxide film serving as the second layer in middle of the layer made of the semiconductor by performing a heat treatment.

[Additional Note 4]

A method of manufacturing a semiconductor device includes: (a) a step of preparing a semiconductor substrate including a basic body, an insulating layer formed on the basic body, and an element forming layer formed on the insulating layer; and (b) a step of forming an optical waveguide and a functional film connected to the optical waveguide by patterning the element forming layer. In the step of (a), the element forming layer includes: a first layer made of a semiconductor formed on the insulating layer; a second layer made of an insulator formed on the first layer; and a third layer made of a semiconductor formed on the second layer. In the step of (b), the optical waveguide includes: a first portion made of a semiconductor formed on the insulating layer; a second portion made of an insulator formed on the first layer; and a third portion made of a semiconductor formed on the second layer, the functional film includes a convex portion and a concave portion, the convex portion includes: a fourth portion in the same layer as that of the first portion; a fifth portion in the same layer as that of the second portion; and a sixth portion in the same layer as that of the third portion; and the concave portion includes a seventh portion in the same layer as that of the first portion. The step of (b) includes: (b1) a step of etching the third layer while using a first mask film on each forming region of the convex portion and the optical waveguide as a mask; and (b2) a step of etching the second layer and the first layer while using a second mask film on each forming region of the convex portion, the optical waveguide, and the concave portion as a mask.

[Additional Note 5]

In the method of manufacturing the semiconductor device described in the additional note 4, in the step of (b2), an eighth portion in the same layer as that of the second portion remains on the seventh portion.

[Additional Note 6]

In the method of manufacturing the semiconductor device described in the additional note 4, each plane shape of the convex portion and the concave portion has a linear shape, the convex portion and the concave portion are alternately arranged, and the functional film is a grating coupler.

[Additional Note 7]

In the method of manufacturing the semiconductor device described in the additional note 4, each of the first layer and the third layer is made of Si, and the second layer has a film selected from a silicon oxide film, a silicon oxynitride film, and a silicon nitride film.

What is claimed is:

1. A method of manufacturing a semiconductor device comprising:
    (a) preparing a semiconductor substrate including a basic body, a first insulating layer formed on the basic body, and an element forming layer formed on the first insulating layer, the element forming layer including a first semiconductor layer formed on the first insulating layer, a second insulating layer formed on the first semiconductor layer, and a second semiconductor layer formed on the second insulating layer; and
    (b) forming a first optical waveguide and a second optical waveguide by patterning the element forming layer,
    wherein the patterning includes:
    (c) etching a part of the second semiconductor layer while using the second insulating layer as an etching stopper, to define part of a side of the first optical waveguide,
    (d) simultaneously with step (c), etching another part of the second semiconductor layer while using the second insulating layer as an etching stopper, to define part of an opposite side of the first optical waveguide, and
    (e) etching the first semiconductor layer, the second insulating layer and the second semiconductor layer to form the second optical waveguide, and
    wherein the second optical waveguide has a rectangular shape in cross-sectional view perpendicular to an extending direction of the second optical waveguide.

2. The method of manufacturing the semiconductor device according to claim 1, wherein a thickness of the first insulating layer is greater than a thickness of the element forming layer.

3. The method of manufacturing the semiconductor device according to claim 1,
    wherein each of the first semiconductor layer and the second semiconductor layer is made of Si, and
    the second insulating layer is a film selected from a silicon oxide film, a silicon oxynitride film, and a silicon nitride film.

4. The method of manufacturing the semiconductor device according to claim 1, further comprising (f) etching a part of the second insulating layer while using the first semiconductor layer as an etching stopper.

5. The method of manufacturing the semiconductor device according to claim 4, further comprising (g) etching another part of the second insulating layer while using the first semiconductor layer as an etching stopper.

6. The method of manufacturing the semiconductor device according to claim 1,
    wherein the first semiconductor layer located under the part of the second semiconductor layer is doped to be a p-type portion, and
    wherein the first semiconductor layer located under the other part of the second semiconductor layer is doped to be an n-type portion.

7. The method of manufacturing the semiconductor device according to claim 1,
    wherein side surfaces of the first semiconductor layer, the second insulating layer and the second semiconductor layer constitute a continuous side surface of the second optical waveguide.

8. The method of manufacturing the semiconductor device according to claim 1,
    wherein the second optical waveguide has a portion made of an intrinsic semiconductor.

* * * * *